United States Patent
Dent et al.

(10) Patent No.: US 9,957,359 B2
(45) Date of Patent: May 1, 2018

(54) FLUORINATED COPOLYMER COMPOSITIONS AND ASSOCIATED METHODS, USES AND ARTICLES

(71) Applicant: Dow Corning Corporation, Midland, MI (US)

(72) Inventors: Stanton J. Dent, Midland, MI (US); Wei Rong, Midland, MI (US); Jacob W. Steinbrecher, Midland, MI (US); Michael R. Strong, Midland, MI (US)

(73) Assignee: DOW CORNING CORPORATION, Midland, MI (US)

( * ) Notice: Subject to any disclaimer, the term of this patent is extended or adjusted under 35 U.S.C. 154(b) by 0 days. days.

(21) Appl. No.: 15/121,084

(22) PCT Filed: Mar. 19, 2015

(86) PCT No.: PCT/US2015/021438
§ 371 (c)(1),
(2) Date: Aug. 24, 2016

(87) PCT Pub. No.: WO2015/148255
PCT Pub. Date: Oct. 1, 2015

(65) Prior Publication Data
US 2016/0362521 A1    Dec. 15, 2016

Related U.S. Application Data

(60) Provisional application No. 61/971,827, filed on Mar. 28, 2014.

(51) Int. Cl.
| C08G 77/46  | (2006.01) |
| C09D 183/04 | (2006.01) |
| C09D 183/12 | (2006.01) |
| C08G 77/18  | (2006.01) |
| C08G 77/16  | (2006.01) |

(52) U.S. Cl.
CPC .......... C08G 77/46 (2013.01); C09D 183/04 (2013.01); C09D 183/12 (2013.01); C08G 77/16 (2013.01); C08G 77/18 (2013.01)

(58) Field of Classification Search
CPC combination set(s) only.
See application file for complete search history.

(56) References Cited

U.S. PATENT DOCUMENTS

| 2,676,182 A | 4/1954 | Daudt et al. |
| 3,159,601 A | 12/1964 | Ashby |
| 3,220,972 A | 11/1965 | Lamoreaux |
| 3,296,291 A | 1/1967 | Chalk |
| 3,419,593 A | 12/1968 | Willing |
| 3,516,946 A | 6/1970 | Modic |
| 3,814,730 A | 6/1974 | Karstedt |
| 3,989,668 A | 11/1976 | Lee et al. |
| 4,611,042 A | 9/1986 | Rivers-Farrell et al. |
| 4,766,176 A | 8/1988 | Lee et al. |
| 4,774,310 A | 9/1988 | Butler |
| 4,784,879 A | 11/1988 | Lee et al. |
| 5,017,654 A | 5/1991 | Togashi et al. |
| 5,036,117 A | 7/1991 | Chung et al. |
| 5,175,325 A | 12/1992 | Brown et al. |
| 6,124,407 A | 9/2000 | Lee et al. |
| 8,022,161 B2 | 9/2011 | Yamane et al. |
| 8,211,248 B2 | 7/2012 | Marya |
| 9,045,647 B2 | 6/2015 | Kleyer et al. |
| 2009/0061039 A1* | 3/2009 | Zhang ................ B29C 33/3857 425/436 R |
| 2010/0272910 A1* | 10/2010 | Kishita ................. C09D 5/165 427/387 |
| 2013/0220177 A1 | 8/2013 | Iyer et al. |

FOREIGN PATENT DOCUMENTS

| EP | 0347895 | 12/1989 |
| EP | 2253682 | 11/2010 |
| WO | 2010138221 | 12/2010 |
| WO | 2013146112 | 10/2013 |

OTHER PUBLICATIONS

"Manipulating Siloxane Surfaces: Obtaining the Desired Surface Function via Engineering Design" authored by Crowe et al. and found at the url https://people.engr.ncsu.edu/jgenzer/pubs/pub-07-14.pdf.*

* cited by examiner

Primary Examiner — Marc S Zimmer
(74) Attorney, Agent, or Firm — Matthew T. Fewkes (57) ABSTRACT

A copolymer composition is provided that is formed as the reaction product of (I) a cured polyorganosiloxane intermediate having repeating Si—O—Si units and at least one Si—OH functional group and (II) a polyfluoropolyether silane. The cured polyorganosiloxane intermediate has a surface having a water contact angle ranging from 40° to 90° as measured by ASTM 5946-04. In certain embodiments, the copolymer composition provides improved dust resistance as compared with cured polyorganosiloxanes from which the copolymer composition is formed.

7 Claims, 2 Drawing Sheets

FLUORINATED COPOLYMER COMPOSITIONS AND ASSOCIATED METHODS, USES AND ARTICLES

CROSS REFERENCE TO RELATED APPLICATIONS

This application is a U.S. national stage filing under 35 U.S.C. § 371 of PCT International Application No. PCT/US2015/021438 filed on Mar. 19, 2015, currently pending, which claims the benefit of U.S. Provisional Patent Application No. 61/971,827 filed under 35 U.S.C. § 119 (e) on Mar. 28, 2014. PCT International Application No. PCT/US2015/021438 and U.S. Provisional Patent Application No. 61/971,827 are hereby incorporated by reference.

The present invention generally relates to copolymer compositions comprising the reaction product of a reaction of: (I) a cured polyorganosiloxane intermediate having repeating Si—O—Si units and at least one Si—OH functional group; and a (II) polyfluoropolyether silane.

Cured polyorganosiloxanes having repeating Si—O—Si units ("Siloxy Units"), such as those formed from polyorganosiloxane compositions curable by a hydrosilylation reaction, are used as protective or coating agents in the manufacture of various optical devices and non-optical devices. In addition, such cured polyorganosiloxanes have been used in various other applications, including, for example, for use in caulks or sealants for building or construction applications.

While these cured polyorganosiloxanes have proven suitable for their intended use in these devices and applications, dust accumulation of the surface of these cured polyorganosiloxanes may have real or perceived negative impacts on the performance of the cured polyorganosiloxanes in such devices or applications. For example, in certain optical devices, wherein the cured polyorganosiloxanes are used as protective or coating layers for the optical device that do not either absorb or dissipate light passing there through, the accumulation of dust on one or more surfaces of these cured polyorganosiloxane may adversely impact these same optical properties.

The present invention thus seeks to minimize or otherwise limit dust pickup on surfaces of cured polyorganosiloxanes (i.e., in an anti-dust surface application), particularly those cured polyorganosiloxanes used in or comprising a suitable optical device or non-optical devices or suitable application, without otherwise affecting or adversely impacting the optical properties or other physical properties of the cured polyorganosiloxanes as they relate to their intended use.

SUMMARY OF THE INVENTION

The present invention provides a copolymer composition comprising the reaction product of a reaction of: (I) a cured polyorganosiloxane intermediate having repeating Si—O—Si units and at least one Si—OH functional group; and a (II) polyfluoropolyether silane.

In certain embodiments, the cured polyorganosiloxane intermediate (I) is formed from a cured polyorganosiloxane having repeating Si—O—Si units. In these embodiments, at least one Si—OH functional group is formed on the cured polyorganosiloxane to make the cured polyorganosiloxane intermediate prior to reacting the cured polyorganosiloxane intermediate with the polyfluoropolyether silane (II).

In one embodiment, the cured polyorganosiloxane is formed by curing a curable composition comprising: (A) a polydiorganosiloxane having an average of at least two aliphatically unsaturated organic groups per molecule, optionally (B) a silicone resin having an average of at least two aliphatically unsaturated organic groups per molecule and a vinyl content of up to 3%, (C) a crosslinker having an average, per molecule, of at least two silicon-bonded hydrogen atoms, and (D) a hydrosilylation catalyst. In these non-limiting embodiments, components (A), optional (B), and (C) and their amounts in the curable composition are selected such that the ratio of a total amount of silicon bonded hydrogen atoms in the curable composition/total amount of aliphatically unsaturated groups in the curable composition ranges from 0.8 to 3.0. In certain of these embodiments, (B) is present as described above.

In other embodiments, the cured polyorganosiloxane is formed by curing a curable composition comprising: (A') an organopolysiloxane of the average structural formula $R^{10}_k SiO_{(4-k)/2}$, (B') an organopolysiloxane that contains in one molecule at least two silicon-bonded hydrogen atoms and at least 15 mole % of all silicon-bonded organic groups in the form of aryl groups; optionally (C') a branched-chain organopolysiloxane and (D') a hydrosilylation catalyst. In these embodiments, "k" is a number ranging from 0.6 to 2.1 and $R^{10}$ designates unsubstituted or halogen-substituted monovalent hydrocarbon groups. In certain of these embodiments, (C') is present.

In certain embodiments, the polyfluoropolyether silane is to the general formula (A"): Y—$Z_a$—[$(OC_3F_6)_b$—$(OCF(CF_3)CF_2)_c$—$(OCF_2CF(CF_3))_d$—$(OC_2F_4)_e$—$(CF(CF_3))_f$—$(OCF_2)_g$]—$(CH_2)_h$—X'—$(C_nH_{2n})$—$((SiR^1_2$—O$)_m$—$SiR^1_2)_i$—$(C_jH_{2j})$—Si—$(X")_{3-z}(R^2)_z$. In general formula (A"), Z is independently selected from —$(CF_2)$—, —$(CF(CF_3)CF_2O)$—, —$(CF_2CF(CF_3)O)$—, —$(CF(CF_3)O)$—, —$(CF(CF_3)CF_2)$—, —$(CF_2CF(CF_3))$—, and —$(CF(CF_3))$—. In addition, a is an integer from 1 to 200; b, c, d, e, f, and g are integers each independently selected from 0 to 200; h, n and j are integers each independently selected from 0 to 20; and i and m are integers each independently selected from 0 to 5. Still further, X' is a bivalent organic group or O; $R^1$ is an independently selected $C_1$-$C_{22}$ hydrocarbyl group; z is an integer independently selected from 0 to 2; X" is an independently selected hydrolysable group; and $R^2$ is an independently selected $C_1$-$C_{22}$ hydrocarbyl group which is free of aliphatic unsaturation. Yet still further, Y is selected from H, F, and $(R^2)_z(X")_{3-z}$Si—$(C_jH_{2j})$—$((SiR^1_2$—O$)_m$—$SiR^1_2)_i$—$(C_nH_{2n})$—X'—$(CH_2)_h$—, wherein X", X', z, $R^1$, $R^2$, j, m, i, n and h are as defined above; provided that when subscript i is 0, subscript j is also 0; when subscript i is an integer selected from 1 to 5, subscript j is an integer selected from 1 to 20 and m is an integer selected from 1 to 5.

The copolymer composition may also be used in, or comprise, optical and non-optical devices. In certain of these embodiments, the copolymer composition provides the device with improved resistance to dust accumulation as compared with the use of the cured polyorganosiloxane (I) in these devices alone.

The copolymer compositions may be used in building, OEM, electronic assembly or construction applications, such as for use in caulks, gaskets, encapsulants, gels, adhesives, conformal coatings or sealants. The copolymer composition may also protect these applications from dust accumulation.

DETAILED DESCRIPTION OF THE INVENTION

All amounts, ratios, and percentages are by weight unless otherwise indicated. The following is a list of definitions as used in this application.

Definitions

The articles "a", "an" and "the" each refer to one or more.

The abbreviation "M" means a siloxane unit of formula $R_3SiO_{1/2}$, where each R independently represents a monovalent atom or group.

The abbreviation "D" means a siloxane unit of formula $R_2SiO_{2/2}$, where each R independently represents a monovalent atom or group.

The abbreviation "T" means a siloxane unit of formula $RSiO_{3/2}$, where R represents a monovalent atom or group.

The abbreviation "Q" means a siloxane unit of formula $SiO_{4/2}$.

The abbreviation "Me" represents a methyl group.

The abbreviation "Ph" represents a phenyl group.

The abbreviation "Vi" represents a vinyl group.

"Combination" means two or more items put together by any method.

The term "optical device" or "optical device application", as defined herein, refers to any device capable of producing, conducting or controlling light. For example, such optical devices may be devices that produce and/or control light such as an optical waveguides, optical lenses, mixing chambers, lighting reflectors, light engines, troffers, optical cameras, photo-couplers, charged couplers, lightguides, light sensing elements, and LED packages such as high brightness LED (HBLED) housings. The optical device could also refer to other devices that merely control light passing there through, such as glass windows for a building.

The term "non-optical device" or "non-optical device application", as defined herein, refers to any device that is not an optical device as defined above. For example, the non-optical device may be a device such as a keypad for a typewriter or a computer, a coaster, or the like.

As used herein, the terms "contact angle" and "CA" refer to the angle tangent at the point where a liquid drop contacts a medium (a substrate or layer coated onto a substrate). The term "water contact angle" and "WCA" refer to the angle tangent at the point where a water drop contacts a substrate or layer coated onto the substrate. The WCA therefore relates to how the water applied to the medium interacts with the surface of the medium (here the water contact angle of a surface of the cured polyorganosiloxane or the cured polyorganosiloxane intermediate) and is not a property of medium itself. Thus, when a surface of the medium is described as having a water contact angle of X°, it is referring the angle tangent at the point where a liquid drop contacts the surface of the medium. The measurement of static water contact angles pursuant to ASTM 5946-04 as described herein were measured using a VCA Optima XE goniometer produced by AST Products, Inc., Billerica, Mass. Reported data was the average WCA of six measurements at multiple places on the surface using multiple samples.

A "lightguide" means a shaped article that carries light from a point-like light source, such as an LED, to a target such as a target line or target plane by internal reflection.

"Unsubstituted hydrocarbon group" means a group made up of hydrogen and carbon atoms.

"Substituted hydrocarbon group" means a group made up of hydrogen and carbon atoms, except that at least one hydrogen atom has been replaced with a different substituent atom or group such as a halogen atom, halogenated organic group, or a cyano group.

The present invention relates generally to copolymer compositions and associated methods for forming copolymer compositions. The present invention also relates to the use of such copolymer compositions as or as a portion of optical or non-optical devices, including optical or non-optical devices as described above. In certain of these embodiments, the copolymer compositions provided the optical device or non-optical device with improved resistance to dust accumulation.

The present invention also generally relates to the use of such copolymer compositions in building, OEM, electronic assembly or construction applications, such as for use in caulks, gaskets, encapsulants, gels, adhesives, conformal coatings or sealants.

The copolymer composition of the present invention includes, as its reaction components, a cured polyorganosiloxane intermediate having repeating Si—O—Si units and at least one Si—OH functional group and a polyfluoropolyether silane, as is described further below.

Copolymer Composition

In certain aspects, the present invention relates generally to copolymer composition comprising the reaction product of a reaction of (I) a cured polyorganosiloxane intermediate having repeating Si—O—Si units at least one Si—OH functional group; and (II) a polyfluoropolyether silane.

A. Component (I)—Cured polyorganosiloxane Intermediate

Component (I) of the copolymer composition is a cured polyorganosiloxane intermediate having repeating Si—O—Si units and at least one Si—OH functional group (i.e., silanol group). In certain embodiments, the surface of the cured polyorganosiloxane intermediate has a water contact angle of less than or equal to 90°, such as from 40° to 90°, as measured in accordance with ASTM 5946-04.

In certain of these embodiments, Component (I) includes M, D and T units. In certain other embodiments, Component (I) may include, M, D, T and Q units.

In certain embodiments, Component (I) may be formed from a cured polyorganosiloxane having repeating Si—O—Si units. In these embodiments, at least one Si—OH functional group is formed on the cured polyorganosiloxane to make the cured polyorganosiloxane intermediate (I) prior to reacting with the polyfluoropolyether silane (II). Methods for forming the at least one Si—OH functional group on the cured polyorganosiloxane are described in further detail below.

The cured polyorganosiloxane having Si—O—Si units, in accordance with the present invention, has a surface having a water contact angle of greater than 90°, such as from greater than 90° to 180°, such as from 100° to 135°, such as from 110° to 130°, as measured by ASTM 5946-04.

Two non-limiting examples of suitable cured polyorganosiloxanes (Non-limiting Embodiment 1" and "Non-limiting Embodiment 2") having Si—O—Si units and having water contact angles as described in the previous paragraph used to form Component (I), and the methods for forming each of these respective cured polyorganosiloxanes, are described as follows.

(1) Non-Limiting Embodiment 1 of Cured Polyorganosiloxane

In one non-limiting embodiment (Non-limiting Embodiment 1), the cured polyorganosiloxane is formed by curing a curable composition comprising (A) a polydiorganosiloxane having an average of at least two aliphatically unsaturated organic groups per molecule, optionally (B) a silicone resin having an average of at least two aliphatically unsaturated organic groups per molecule and a vinyl content of up to 3%, (C) a crosslinker having an average, per molecule, of at least two silicon-bonded hydrogen atoms, and (D) a hydrosilylation catalyst. In these non-limiting embodiments, component (A), optional component (B), and component (C) and their amounts in the curable composition are selected such that the ratio of a total amount of silicon bonded hydrogen atoms in the curable composition/total amount of aliphatically unsaturated groups in the curable composition ranges from 0.8 to 3.0, such as from 1.2 to 1.7.

As noted above, Component (A) comprises a polydiorganosiloxane having an average at least two aliphatically unsaturated organic groups per molecule.

An aliphatically unsaturated organic group, as defined herein, includes any carbon-containing functional group that includes, on average, at least one carbon-carbon double bond or carbon-carbon triple bond. In certain embodiments, for example, the aliphatically unsaturated organic groups are aliphatically unsaturated hydrocarbon groups.

The aliphatically unsaturated organic groups in component (A) may be alkenyl exemplified by, but not limited to, vinyl, allyl, butenyl, pentenyl, and hexenyl; alternatively vinyl. The aliphatically unsaturated organic groups may be alkynyl groups exemplified by, but not limited to, ethynyl, propynyl, and butynyl. The aliphatically unsaturated organic groups in component (A) may be located at terminal, pendant, or both terminal and pendant positions. Alternatively, the aliphatically unsaturated organic groups in component (A) may be located at terminal positions of the at least one organopolysiloxane.

The remaining silicon-bonded organic groups that may also be present in the organopolysiloxanes of component (A) may be substituted and unsubstituted hydrocarbon groups free of aliphatic unsaturation. Monovalent unsubstituted hydrocarbon groups are exemplified by, but not limited, to alkyl groups such as methyl, ethyl, propyl, pentyl, octyl, undecyl, and octadecyl; cycloalkyl groups such as cyclohexyl. Monovalent substituted hydrocarbon groups are exemplified by, but not limited to halogenated alkyl groups such as chloromethyl, 3-chloropropyl, and 3,3,3-trifluoropropyl, fluoromethyl, 2-fluoropropyl, 3,3,3-trifluoropropyl, 4,4,4-trifluorobutyl, 4,4,4,3,3-pentafluorobutyl, 5,5,5,4,4,3, 3-heptafluoropentyl, 6,6,6,5,5,4,4,3,3-nonafluorohexyl, and 8,8,8,7,7-pentafluorooctyl.

In certain embodiments, component (A) comprises a polymer combination comprising (A1) a first polydiorganosiloxane having an average of at least two aliphatically unsaturated organic groups per molecule and having a viscosity of up to 12,000 mPa·s (measured at 25 degrees Celsius), and (A2) a second polydiorganosiloxane having an average of at least two aliphatically unsaturated organic groups per molecule and having a viscosity of at least 45,000 mPas (measured at 25 degrees Celsius).

Component (A1) can be an polydiorganosiloxane or a combination comprising two or more polydiorganosiloxanes having an average of at least two aliphatically unsaturated organic group per molecule that differ in at least one of the following properties: structure, average molecular weight, siloxane units, and sequence. As noted above, the viscosity of component (A1) is up to 12,000 mPa·s (measured at 25 degrees Celsius). Alternatively, the viscosity of component (A1) may range from 300 mPa·s to 12,000 mPa·s, alternatively from 300 mPa·s to 2,500 mPa·s, and alternatively from 300 mPa·s to 2,000 mPa·s (measured at 25 degrees Celsius). The amount of component (A1) in the composition may range from 10% to 90%, alternatively 70% to 80%, based on the combined weight of components (A1) and (A2).

In certain embodiments, component (A1) has the general formula (I): $R^3_3SiO-(R^4SiO)_{aa}-SiR^3_3$, wherein each $R^3$ and $R^4$ are independently an aliphatically unsaturated organic group or a monovalent substituted or unsubstituted hydrocarbon group as described above and the subscript a is an integer having a value sufficient to provide component (A1) with a viscosity up to 12,000 mPa·s as measured at 25 degrees Celsius, with the proviso that on average at least two of the $R^3$ and/or $R^4$ are unsaturated organic groups. Alternatively, formula (I) may be an α,ω-dialkenyl-functional organopolysiloxane.

Component (A2) can be an polydiorganosiloxane or a combination comprising two or more polydiorganosiloxanes having an average of at least two aliphatically unsaturated organic groups per molecule that differ in at least one of the following properties: structure, average molecular weight, siloxane units, and sequence. As noted above, the viscosity of component (A2) is at least 45,000 mPa·s (measured at 25 degrees Celsius). Alternatively, the viscosity of component (A2) may range from 45,000 mPa·s to 65,000 mPa·s (measured at 25 degrees Celsius). The amount of component (A2) in the composition may range from 10% to 90%, alternatively 20% to 30%, based on the combined weight of components (A1) and (A2).

In certain embodiments, component (A2) has the general formula (II): $R^5_3SiO-(R^6SiO)_{bb}-SiR^5_3$, wherein each $R^5$ and $R^6$ are independently selected from the group consisting of aliphatically unsaturated organic groups such as the substituted or unsubstituted hydrocarbon group as described above and the subscript b is an integer having a value sufficient to provide component (A2) with a viscosity of at least 45,000 mPa·s, alternatively from 45,000 mPa·s to 65,000 mPa·s as measured at 25 degrees Celsius, with the proviso that on average at least two of the $R^3$ and/or $R^4$ are unsaturated organic groups. Alternatively, formula (II) may be an α,ω-dialkenyl-functional organopolysiloxane.

The silicone resin (B) useful herein, when present, contains an average of at least two aliphatically unsaturated organic groups per molecule. The amount of aliphatically unsaturated organic groups in the resin may be up to 3.0% based on the weight of the silicone resin (B). Alternatively, the amount of aliphatically unsaturated organic groups in the silicone resin (B) may range from 1.9% to 3.0%, alternatively 2.0% to 3.0%, alternatively 1.9% to 3.0%, and alternatively 1.5% to 2.0% on the same basis.

The silicone resin (B) comprises monofunctional units (M) represented by $R^7_3SiO_{1/2}$ and tetrafunctional (Q) units represented by $SiO_{4/2}$. $R^7$ represents a monovalent organic group, which is a monovalent substituted or unsubstituted hydrocarbon group. The silicone resin (B) is soluble in liquid hydrocarbons such as benzene, toluene, xylene, heptanes and the like or in liquid organosilicon compounds such as low viscosity cyclic or linear polydiorganosiloxanes. Exemplary solvents are listed below.

In the $R^7_3SiO_{1/2}$ unit, $R^7$ may be a monovalent unsubstituted hydrocarbon groups, exemplified by alkyl groups such as methyl, ethyl, propyl, butyl, pentyl, octyl, undecyl, and octadecyl; alkenyl groups, such as vinyl, allyl, butenyl, pentenyl and hexenyl; cycloaliphatic radicals, such as cyclohexyl and cyclohexenylethyl; alkynyl groups such as ethynyl, propynyl, and butynyl; cycloalkyl groups such as cyclopentyl and cyclohexyl; and aromatic groups such as ethylbenzyl, naphthyl, phenyl, tolyl, xylyl, benzyl, styryl, 1-phenylethyl, and 2-phenylethyl, alternatively phenyl. Non-reactive substituents that can be present on $R^5$ include but are not limited to halogen and cyano. Monovalent organic groups which are substituted hydrocarbons groups are exemplified by, but not limited to, halogenated alkyl groups such as chloromethyl, 3-chloropropyl, 3,3,3 trifluoropropyl, fluoromethyl, 2-fluoropropyl, 4,4,4 trifluorobutyl, 4,4,4,3,3-pentafluorbutyl, 5,5,5,4,4,3,3-heptafluoropentyl, 6,6,6,5,5,4,4,3,3-nonafluorohexyl, and 8,8,8,7,7-pentafluorooctyl.

The silicone resin (B), when present, may have a ratio of M units to Q units (M:Q ratio) ranging from 0.6:1 to 1.1:1. The silicone resin (B) comprising $R^7_3SiO_{1/2}$ units and $SiO_{4/2}$ units may have a number average molecular weight ranging from 2,000 to 5,000, see Lee, et al., U.S. Pat. No. 6,124,407 for a description of suitable silicone resins and how to prepare them. The number-average molecular weight ($M_n$) may be determined by gel permeation chromatography employing a low angle laser light scattering detector, or a refractive index detector and silicone resin (MQ) standards.

The silicone resin (B) can be prepared by any suitable method. Silicone resins of this type have reportedly been prepared by cohydrolysis of the corresponding silanes or by silica hydrosol capping methods known in the art. The silicone resin may be prepared by the silica hydrosol capping process of Daudt, et al., U.S. Pat. No. 2,676,182; of Rivers-Farell, et al., U.S. Pat. No. 4,611,042; of Butler, U.S. Pat. No. 4,774,310; and Lee, et al., U.S. Pat. No. 6,124,407.

The intermediates used to prepare the silicone resin (B) are typically triorganosilanes of the formula $R^7_3SiJ'$, where $R^7$ is as described above and J' represents a hydrolysable group, and either a silane with four hydrolysable groups, such as halogen, alkoxy or hydroxyl, or an alkali metal such as sodium silicate.

It is desirable that the content of silicon-bonded hydroxyl groups (i.e., $HOSiO_{3/2}$ groups) in the silicone resin, when the silicone resin is present, be below 0.7% of the total weight of the silicone resin, alternatively below 0.3%. Silicon-bonded hydroxyl groups formed during preparation of the silicone resin may be converted to trihydrocarbylsiloxy groups or hydrolyzable groups by reacting the silicone resin with silane, disiloxane or disilazane containing the appropriate terminal group. Silanes containing hydrolyzable groups are typically added in excess of the quantity required to react with the silicon-bonded hydroxyl groups of the silicone resin.

The silicone resin (B), when present, may be one silicone resin. Alternatively, the silicone resin (B), when present, may comprise two or more silicone resins, where the resins differ in at least one of the following properties: structure, hydroxyl and/or hydrolyzable group content, molecular weight, siloxane units, and sequence. The amount of silicone resin in the composition may vary depending on the type and amounts of polymers present, and the aliphatically unsaturated organic groups (e.g., vinyl) content of components (A) and (B), however, when present the amount of silicone resin (B) may range from 25% to 40%, alternatively 26% to 38%, by weight of the cured diorganosiloxane composition.

Component (C) is a crosslinker having an average, per molecule, of at least two silicon-bonded hydrogen atoms. Component (C) may comprise a polyorganohydrogensiloxane or a resinous organohydrogen silica structure. Component (C) can be a single polyorganohydrogensiloxane or resinous organohydrogen silica structure or a combination comprising two or more polyorganohydrogensiloxanes or resinous organohydrogen silica structures that differ in at least one of the following properties: structure, viscosity, average molecular weight, siloxane units, and sequence.

In certain embodiments, component (C) is a linear polyorganohydrogensiloxane of general formula (IV): $HR^8_2SiO-(R^8SiO)_{cc}-SiR^8_2H$, where each $R^8$ is independently a hydrogen atom, or a monovalent organic group or a monovalent hydrocarbon group, which is a monovalent substituted or unsubstituted hydrocarbon group, with the proviso that on average at least two $R^8$ per molecule are hydrogen atoms as exemplified above by $R^5$, with the proviso that at least two $R^8$ per molecule are hydrogen atoms, and subscript cc is an integer with a value of 1 or more. Alternatively, at least three $R^8$ per molecule are hydrogen atoms and cc may range from 1 to 20, alternatively 1 to 10. Component (C) may comprise a hydrogen terminated organopolysiloxane. Alternatively, component (C) may comprise a poly(dimethyl/methylhydrogen)siloxane copolymer with or without terminal silicon-bonded hydrogens.

Alternatively, in certain embodiments, component (C) is a branched polyorganohydrogensiloxane of the unit formula (IV): $(R^9SiO_{3/2})_{dd}(R^9_2SiO_{2/2})_{ee}(R^9SiO_{1/2})_{ff}(SiO_{4/2})_{gg}(X'''O)_{hh}$, wherein $X'''$ is an alkoxy-functional group. Each $R^9$ is independently a hydrogen atom or a monovalent organic group or a monovalent hydrocarbon group, which is a monovalent substituted or unsubstituted hydrocarbon group as exemplified above for $R^7$, with the proviso that an average of at least two per molecule of $R^9$ are hydrogen atoms. In formula (IV), the branched polyorganohydrogensiloxane contains an average of at least two silicon bonded hydrogens per molecule, however 0.1 mol % to 40 mol % of $R^9$ may be hydrogen atoms.

In formula (IV), the subscript dd is a positive number, subscript ee is 0 or a positive number, subscript ff is 0 or a positive number, subscript gg is 0 or a positive number, subscript hh is 0 or a positive number, e/d has a value ranging from 0 to 10, ff/ee has a value ranging from 0 to 5, gg/(dd+ee+gg+ff) has a value ranging from 0 to 0.3, and hh/(dd+ee+gg+ff) has a value ranging from 0 to 0.4.

The amount of component (C) added is sufficient to provide that SiH/Vi ratio is in a range from 0.8 to 3.0, such as from 1.2 to 1.7, as described above.

Component (D) is a hydrosilylation catalyst. The hydrosilylation catalyst (D) is added in an amount sufficient to promote the curing reaction of the composition. However, the amount of component (D) may range from 0.01 to 1,000 ppm, alternatively 0.01 to 100 ppm, and alternatively 0.1 to 50 ppm, alternatively 1 to 18 ppm, and alternatively 1 to 7 ppm, of platinum group metal based on weight of the silicone composition.

Suitable hydrosilylation catalysts are known in the art and commercially available. Component (D) may comprise a platinum group metal selected from the group consisting of platinum, rhodium, ruthenium, palladium, osmium or iridium metal or organometallic compound thereof, and a combination thereof. Component (D) is exemplified by platinum black, compounds such as chloroplatinic acid, chloroplatinic acid hexahydrate, a reaction product of chloroplatinic acid and a monohydric alcohol, platinum bis-(ethylacetoacetate), platinum bis-(acetylacetonate), platinum dichloride, and complexes of said compounds with olefins or low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum. These complexes may be microencapsulated in a resin matrix. Alternatively, the catalyst may comprise 1,3-diethenyl-1,1,3,3-tetramethyldisiloxane complex with platinum.

Suitable hydrosilylation catalysts for Component (D) are described in, for example, U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are also known in the art, as exemplified in U.S. Pat. No. 4,766,176; and U.S. Pat. No. 5,017,654.

As noted above, the cured polyorganosiloxane according to non-limiting embodiment 1 has a surface having a water contact angle of greater than 90°, such as from greater than 90° to 180°, such as from 100° to 135°, such as from 110° to 130°, as measured by ASTM 5946-04.

(2) Non-Limiting Embodiment 2 of Cured Polyorganosiloxane

In another non-limiting embodiment (Non-limiting Embodiment 2), the cured polyorganosiloxane may be formed by curing a curable composition comprising the following components:

(A') an organopolysiloxane of the following average structural formula:

(B') an organopolysiloxane that contains in one molecule at least two silicon-bonded hydrogen atoms and at least 15 mole % of all silicon-bonded organic groups in the form of aryl groups;

optionally (C') a branched-chain organopolysiloxane and (D') a hydrosilylation catalyst.

Each of components (A')-(D'), are described in further detail below.

As noted above, component (A') is represented by the following average structural formula:

In the above formula, "k" is a number ranging from 0.6 to 2.1 and $R^{10}$ designates unsubstituted or halogen-substituted monovalent hydrocarbon groups, which can be exemplified by a methyl, ethyl, propyl, butyl, pentyl, hexyl, heptyl, or a similar alkyl group; a vinyl, allyl, butenyl, pentenyl, hexenyl, or a similar alkenyl group; a phenyl, tolyl, xylyl, naphthyl, or a similar aryl group; a benzyl, phenethyl, or a similar aralkyl group; and 3-chloropropyl, 3,3,3-trifluoropropyl, or a similar halogen-substituted alkyl group. However, in one molecule at least two groups designated by $R^1$ are alkenyl groups. Most preferable of these alkenyl groups are vinyl groups. Furthermore, in order to reduce damping of light that may be caused by refraction, reflection, scattering, etc., when the light passes through the cured product, it is recommended that in one molecule at least 30 mole %, preferably at least 40 mole % of the groups represented by $R^{10}$ be aryl group, in particular, phenyl groups. In the above formula, "a" is a number ranging from 0.6 to 2.1. Component (A') may have a linear, branched, or a cyclic molecular structure. Molecular structure may be of one type or a combination of two or more types.

Component (A') may also comprise a linear-chain organopolysiloxane of the following general formula:

$$R^{12}_3SiO(R^{12}_2SiO)_tSiR^{12}_3$$

and/or a branched-chain organopolysiloxane of the following average unit formula:

In the above formulae, each $R^{12}$ and $R^{13}$ independently designates unsubstituted or halogen-substituted monovalent hydrocarbon groups, which are the same as defined above. However, in one molecule at least two groups designated by $R^{12}$ (for the linear-chain organopolysiloxane) and $R^{13}$ (for the branched-chain organopolysiloxane) are alkenyl groups. Most preferable of these alkenyl groups are vinyl groups. In order to reduce damping of light that may be caused by refraction, reflection, scattering, etc., when the light passes through the cured product, it is recommended that in one molecule at least 30 mole %, preferably at least 40 mole % of groups be represented by $R^{12}$ (for the linear-chain organopolysiloxane) and $R^{13}$ (for the branched-chain organopolysiloxane) be aryl group, in particular, phenyl groups. In the above formula, "t" is a number ranging from 5 to 1,000; "u" is a positive number, "v" is 0 or a positive number, "w" is 0 or a positive number, "x" is 0 or a positive number, "y" is 0 or a positive number; "v/u" is a number ranging from 0 to 10, "w/u" is a number ranging from 0 to 5, "x/(u+v+w+x)" is a number ranging from 0 to 0.3, and "y/(u+v+w+x)" is a number ranging from 0 to 0.4. In addition, X"" designates a hydrogen atom or an alkyl group. The alkyl groups designated by X"" may be methyl, ethyl, propyl, butyl, pentyl, hexyl, or heptyl groups, of which methyl groups are preferable.

Component (B'), which is a cross-linking agent of the curable composition, comprises an organopolysiloxane that contains in one molecule at least two silicon-bonded hydrogen atoms. The silicon-bonded organic groups contained in component (B') are represented by methyl, ethyl, propyl, butyl, pentyl, hexyl, heptyl, or similar alkyl groups; phenyl, tolyl, xylyl, naphthyl, or similar aryl groups; benzyl, phenethyl, or similar aralkyl groups; and 3-chloropropyl, 3,3,3-trifluoropropyl, or similar halogenated alkyl groups. In order to reduce damping of light that may be caused by refraction, reflection, scattering, etc., when the light passes through the cured product, it is recommended that in one molecule of this component at least 15 mole %, preferably at least 25 mole % of all silicon-bonded organic groups be aryl group. Component (B') may have a linear, branched, or cyclic molecular structure. Molecular structure may be of one type or a combination of two or more types.

Component (B') may also comprise a linear-chain organopolysiloxane represented by the following general formula:

and/or a branched-chain organopolysiloxane of the following average unit formula:

In these formulae, $R^{14}$ independently designates a hydrogen atoms, or unsubstituted or halogen-substituted monovalent hydrocarbon groups. The monovalent hydrocarbon groups designated by $R^{14}$ may be exemplified by methyl, ethyl, propyl, butyl, pentyl, hexyl, heptyl, or similar alkyl groups; phenyl, tolyl, xylyl, naphthyl, or similar aryl groups; benzyl, phenethyl, or similar aralkyl groups; and 3-chloropropyl, 3,3,3-trifluoropropyl, or similar halogenated alkyl groups. However, in one molecule, at least two groups designated by $R^{14}$ should be formed by hydrogen atoms. Furthermore, in order to reduce damping of light that may be caused by refraction, reflection, scattering, etc., when the light passes through the cured product, it is recommended that in one molecule of this component at least 15 mole %, preferably at least 40 mole % of groups represented by $R^3$ be aryl group. The preferable aryl groups are phenyl groups. In the formulae, "n" is an integer ranging from 5 to 1,000, "p" is a positive number, "q" is 0 or a positive number, "r" is 0 or a positive number, "s" is 0 or a positive number, "t" is 0 or a positive number, "q/p" ranges from 0 to 10, "r/p" ranged from 0 to 5, "s/(p+q+r+s)" ranges from 0 to 3, and "t/(p+q+r+s)" ranges from 0 to 0.4.

Component (B') is added in such an amount that the mole ratio of hydrogen atoms contained in this component to alkenyl groups of components (A') and (C') is in the range of 0.1 to 5, preferably in the range of 0.5 to 2. If component (B') is added in an amount less than the recommended lower limit, the obtained composition will not be cured to a sufficient degree. If, on the other hands, the added amount of component (B') exceeds the recommended upper limit, this will impair heat resistance of a cured product of the composition.

Component (C') is used for improving adherence of the composition to substrates. This component is a branched-chain organopolysiloxane of the following average unit formula:

$(R^{11}SiO_{3/2})_o(R^{11}{}_2SiO_{2/2})_p(R^{11}{}_3SiO_{1/2})_q(SiO_{4/2})_r(X''''O_{1/2})_s$

In this formula, $R^{11}$ independently designates an alkyl group, alkenyl group, aryl group, or an epoxy-containing organic group. As the alkyl group, $R^{11}$ may be specifically exemplified by a methyl, ethyl, propyl, butyl, pentyl, hexyl, or heptyl group, of which methyl group is preferable. As alkenyl group, $R^{11}$ may be exemplified by vinyl, allyl, butenyl, pentenyl, or a hexenyl group, of which the vinyl group is preferable. The aryl groups represented by $R^{11}$ may be specifically exemplified by phenyl, tolyl, xylyl, and naphthyl groups, of which phenyl groups are preferable. The epoxy-containing organic groups designated by $R^{11}$ may be specifically exemplified by 3-glycidoxypropyl, 3,4-epoxycyclohexylethyl, 3,4-epoxybutyl, or 5,6-epoxyhexyl group, of which 3-glycidoxypropyl group is preferable. However, in one molecule, at least 5 mole %, preferably at least 8 mole % of all groups designated by $R^{11}$ are alkenyl groups. Furthermore, in one molecule, at least 15 mole %, preferably 25 mole % of all groups designated by $R^{11}$ are aryl groups. Moreover, in one molecule, at least 10 mole %, preferably at least 20 mole %, of all groups designated by $R^{11}$ are epoxy-containing organic groups. In the above formula, X'''' designates a hydrogen atom or an alkyl group. The alkyl groups designated by X'''' may be methyl, ethyl, propyl, butyl, pentyl, hexyl, or heptyl groups, of which methyl groups are preferable. In the above formula, "b" is a positive number, "c" is 0 or a positive number, "d" is 0 or a positive number, "e" is 0 or a positive number, and "f" is 0 or a positive number; "c/b" is a number ranging from 0 to 10; "d/b" is a number ranging from 0 to 5; "e/(b+c+d+e)" is a number ranging from 0 to 0.3; and "f/(b+c+d+e)" is a number raging from 0 to 0.02. Component (C') should have a mass-average molecular weight not lower than 2,000.

Component (C'), when present, is added in an amount of 0.1 to 20 parts by mass, preferably 0.1 to 10 parts by mass, and most preferably 0.2 to 10 parts by mass per 100 parts by mass of the sum of components (A') and (B'). If component (C') is added in an amount less than the recommended lower limit, this will impair adherence of the obtained cured products to substrates. If, on the other hands, the added amount of component (C') exceeds the recommended upper limit, this will cause coloring of the cured product.

Component (D') is a hydrosilylation catalyst, which is used for accelerating the hydrosilylation reaction between silicon-bonded hydrogen atoms of component (B') and alkenyl groups contained in components (A') and (C'). Component (D') may comprise a platinum-based catalyst, rhodium-based catalyst, or a palladium-based catalyst. The platinum-based catalyst is preferable since it significantly accelerates curing of the composition. The platinum-based catalyst can be exemplified by a platinum-alkenylsiloxane complex, a platinum-olefin complex, or a platinum-carbonyl complex, of which the platinum-alkenylsiloxane complex is preferable. Such an alkenylsiloxane can be exemplified by the 1,3-divinyl-1,1,3,3-tetramethyl disiloxane, 1,3,5,7-tetramethyl-1,3,5,7-tetravinyl cyclotetrasiloxane, substituted alkenylsiloxane which are the aforementioned alkenylsiloxanes having a part of the methyl groups substituted with ethyl, phenyl groups, or substituted alkenylsiloxane which are the aforementioned alkenylsiloxanes having a part of the vinyl groups substituted with aryl, hexenyl, or similar groups. From the viewpoint of better stability of the platinum-alkenylsiloxane complexes, the use of the 1,3-divinyl-1,1,3,3-tetramethyl disiloxane is preferable. For further improvement of stability, the aforementioned alkenylsiloxane complexes can be combined with 1,3-divinyl-1,1,3,3-tetramethyl disiloxane, 1,3-diallyl-1,1,3,3-tetramethyl disiloxane, 1,3-divinyl-1,1,3,3-tetraphenyl disiloxane, 1,3,5,7-tetramethyl-1,3,5,7-tetravinyl cyclotetrasiloxane, or similar alkenylsiloxanes, dimethylsiloxane oligomers, or other organosiloxane oligomers. Most preferable are alkenylsiloxanes.

Component (D') is added in an amount sufficient for curing the composition. More specifically, in terms of mass units, this component is added in an amount of 0.01 to 500 ppm, preferably 0.01 to 100 ppm, and most preferably, 0.01 to 50 ppm of the metal atoms of this component per mass of the composition. If the added amount of component (D') is below the recommended lower limit, the composition will not be cured to a sufficient degree. If, on the other hand, the added amount exceeds the recommended upper limit, this will lead to coloring of a cured product of the composition.

As noted above, the cured polyorganosiloxane according to non-limiting embodiment 2 has a surface having a water contact angle of greater than 90°, such as from greater than 90° to 180°, such as from 100° to 135°, such as from 110° to 130°, as measured by ASTM 5946-04.

3. Additional Components for Curable Composition

The curable composition as described above, including the curable composition according to any embodiment described above, including Non-Limiting Embodiments 1 and 2, may further comprise one or more additional components, including, but not limited to, inhibitors, mold release agents, optically active agents, fillers, adhesion promoters, heat stabilizers, flame retardants, reactive diluents, pigments, flame retarders, oxidation inhibitors, and a combinations thereof. Exemplary additional components are described in paragraphs [0047]-[0056] of WO 2010/0138221 A1 to Bahuder et al. and are hereby incorporated by reference in their entirety.

Regardless of the additional components, the resultant cured polyorganosiloxane in accordance with the present invention has a surface having a water contact angle of greater than 90°, such as from greater than 90° to 180°, such as from 100° to 135°, such as from 110° to 130°, as measured by ASTM 5946-04.

4. Forming a Cured Polyorganosiloxane from the Curable Composition

The cured polyorganosiloxane may be obtained by curing the curable composition as described above, including the curable composition according to any embodiment described above, including Non-Limiting Embodiments 1 and 2, at room temperature or with heating, however heating may accelerate curing. The exact time and temperature for heating will vary depending on various factors including the amount of catalyst and the type and amount of inhibitor present (if any), however curing may be performed by heating at a temperature ranging from 50° C. to 200° C. for an amount of time ranging from several seconds to several hours.

In certain embodiments, the cured polyorganosiloxane, formed by curing the curable composition as described herein, may have a Shore A hardness of at least 30, alternatively Shore A hardness may range from 30 to 100; as measured by ASTM D2240 by the type A durometer. (ASTM D2240 for Shore A durometer corresponds to JIS K 6253 type-A which specifies testing methods for durometer hardness of plastics.) Alternatively, the cured polyorganosiloxane may have Shore A hardness up to 55, alternatively Shore A hardness may range from 30 to 55.

In certain embodiments, the cured polyorganosiloxane may have a tensile strength of at least 3 MPa, alternatively tensile strength may range from 3 MPa to 14 MPa as measured by ASTM D412. Still further, the cured polyorganosiloxane may have an elongation at break of at least 50%, alternatively elongation at break may range from 5% to 500%, such as from 50% to 350%, such as from 50% to 250%, also as measured by ASTM D412. The cured polyorganosiloxane may exhibit excellent thermo-optic stability, improved mechanical properties, weather resistance and heat resistance. Transmittance is measured on samples initially after cure, then the samples are heated at 150° C. for 1000 hours and transmittance is measured again using a ultraviolet-visible spectrophotometer with medium scanning speed, 1 nanometer slit width to measure yellowing.

5. Making the Cured Polyorganosiloxane Intermediate from the Cured Polyorganosiloxane The cured polyorganosiloxane intermediate, in certain embodiments, is made by forming at least one Si—OH functional group on the cured polyorganosiloxane. In certain embodiments, multiple Si—OH functional groups are formed.

In certain embodiments, the method for forming at least one Si—OH functional group on the cured polydiorganosiloxane is accomplished by plasma treating the cured polydiorganosiloxane using oxygen or air or an oxygen containing mixture of gases as a source gas, also referred to as an activation gas. In certain other embodiments, argon may also be used as the source gas. In this method, the cured polydiorganosiloxane is placed into a chamber of a Plasma Treatment System with the relevant surfaces being exposed to plasma. The source gas pressure within the chamber may be set to a desired pressure, and a plasma power is supplied at a desired wattage for a desired time period sufficient to react the oxygen atoms present with the silicon-bonded methyl groups (or other silicon-bonded alkyl groups) or silicon-bonded hydrogen atoms on the cured polyorganosiloxane to form one or more Si—OH functional groups on the cured polyorganosiloxane, and hence form the cured polyorganosiloxane intermediate.

In certain embodiments, the gas pressure in the chamber is set between 50 and 500 mTorr, such as 300 mTorr. In certain embodiments, the wattage of the Plasma Treatment System is set between 50 and 500 watts, such as 100 watts. In still other embodiments, the length of the plasma treatment varies from a few seconds to many minutes, such as from 30 seconds. The pressure, wattage, and time of exposure are generally set to obtain the desired amount of Si—OH functional groups on the cured polyorganosiloxane, with higher pressures, higher wattages, and/or longer exposures generating an increased number of Si—OH functional groups.

In still other embodiments, the method for forming at least one Si—OH functional group on the cured polyorganosiloxane is accomplished by applying a base or peroxide to the cured polyorganosiloxane. In a similar manner to the plasma treatment, the base or peroxide reacts with the silicon-bonded hydrogen atoms and/or silicon-bonded methyl or other alkyl groups to form an increased number of Si—OH functional groups on the cured polyorganosiloxane, and hence form the cured polyorganosiloxane intermediate. In still further, embodiments, the method for forming at least one Si—OH functional group on the cured polyorganosiloxane is accomplished by corona discharge, flame ionization or atmospheric plasma.

In any of the above embodiments, the physical properties of the resultant cured polyorganosiloxane intermediate are substantially the same as the physical properties of the cured polyorganosiloxane as described in Section (4) immediately above. However, the introduction of one or more Si—OH functional groups reduces the water contact angle of the surface of the "treated cured polyorganosiloxane" (i.e., the cured polyorganosiloxane intermediate) to within the range of from 40° to 90° as measured by ASTM 5946-04, which allows for the subsequent reaction of the cured polyorganosiloxane intermediate with the polyfluoropolyether silane to form the copolymer composition, as will be described further below.

B. Component (II)—Polyfluoroqolyether Silane

In various embodiments, the polyfluoropolyether silane has the following general formula (A):

While the polyfluoropolyether silane of the non-aqueous emulsion is not limited to that of general formula (A"), specific aspects of general formula (A") are described in greater detail below. The groups indicated by subscripts b-g, i.e., the groups within the square brackets in formula (A"), may be present in any order within the polyfluoropolyether silane, including a different order as that which is represented in general formula (A") above and throughout this disclosure. Moreover, these groups may be present in randomized or block form. In addition, the group represented by subscript b is typically linear, i.e., the group represented by subscript b may alternatively be written as (O—$CF_2$—$CF_2$—$CF_2$)$_b$. In the description below, $C_{p'}$, $C_{q'}$ (with p' and q' each being integers) regarding a hydrocarbon or alkyl group means such group has from p' to q' carbon atoms. When the group indicated by subscript i is present, the polyfluoropolyether silane comprises a siloxane segment. Even in these embodiments, the polyfluoropolyether silane is generally referred to as a silane in view of the terminal silicon atom that is not present in any siloxane segment.

In general formula (A") above, Z is independently selected from —($CF_2$)—, —(CF($CF_3$)$CF_2$O)—, —($CF_2$CF($CF_3$)O)—, —(CF($CF_3$)O)—, —(CF($CF_3$)—$CF_2$)—, —($CF_2$—CF($CF_3$))—, and —(CF($CF_3$))—. Z is typically selected such that the polyfluoropolyether silane does not include an oxygen-oxygen (O—O) bond within the backbone. In addition, in this general formula, a is an integer from 1 to 200; b, c, d, e, f, and g are integers each independently selected from 0 or from 1 to 200; h, n and j are integers each independently selected from 0 or from 1 to 20; i and m are integers each independently selected from 0 or from 1 to 5; X' is a divalent organic group or an oxygen atom; $R^1$ is an independently selected $C_1$-$C_{22}$ hydrocarbyl group; z is an integer independently selected from 0 to 2; X" is an independently selected hydrolysable group; $R^2$ is an independently selected $C_1$-$C_{22}$ hydrocarbyl group which is free of aliphatic unsaturation; and Y is selected from H, F, and $(R^2)_z(X")_{3-z}Si$—$(C_jH_{2j})$—$((SiR^1{}_2$—$O)_m$—$SiR^1{}_2)_i$—$(C_nH_{2n})$—$X'$—$(CH_2)_h$—; wherein X", X', z, $R^1$, $R^2$, j, m, i, n, and h are as defined above.

$R^1$, which is an independently selected $C_1$-$C_{22}$ hydrocarbyl group, may be linear, branched, or cyclic. In addition, $R^1$ may include heteroatoms within the hydrocarbyl group, such as oxygen, nitrogen, sulfur, etc., and may be substituted or unsubstituted. Typically, $R^1$ is $C_1$-$C_4$ alkyl group. In addition, the groups indicated by subscripts n and j, i.e., groups $(C_nH_{2n})$ and $(C_jH_{2j})$, may also be independently linear or branched. For example, when n is 3, these groups may independently have the structure —$CH_2$—$CH_2$—$CH_2$—, —$CH(CH_3)$—$CH_2$, or —$CH_2$—$CH(CH_3)$—, wherein the latter two structures have pendent alkyl groups, i.e., these structures are branched and not linear.

With respect to the moieties represented by subscripts m, i, and j: when subscript i is 0, subscript j is also 0; when subscript i is an integer greater than 0, subscript j is also an integer greater than 0; and when subscript i is an integer greater than 0, m is also an integer greater than 0. Said differently, when the group represented by subscript i is present, the group represented by subscript j is also present. The inverse is also true, i.e., when the group represented by subscript i is not present, the group represented by subscript j is also not present. In addition, when i is an integer greater than 0, the group represented by subscript m is present, and m is also an integer greater than 0. In certain embodiments, subscripts m and i are each 1. Typically, the subscript i does not exceed 1, although the subscript m may be an integer greater than 1 such that siloxane bonds (i.e., Si—O bonds) are present within the group represented by subscript i.

In certain embodiments, the polyfluoropolyether silane is subject to the proviso that when Y is F; Z is —$(CF_2)$—; a is an integer from 1 to 3; and subscripts c, d, f, i, m, and j are each 0.

The hydrolysable group represented by X" in general formula (A") is independently selected from H, a halide group, an alkoxy (—$OR^3$) group, an alkylamino (—$NHR^3$ or —$NR^3R^4$) group, a carboxy (—OOC—$R^3$) group, an alkyliminoxy (—O—N=$CR^3R^4$) group, an alkenyloxy (O—C(=$CR^3R^4$)$R^5$) group, or an N-alkylamido (—$NR^3COR^4$) group, wherein $R^3$, $R^4$ and $R^5$ are each independently selected from H and a $C_1$-$C_{22}$ hydrocarbyl group. When $R^3$, $R^4$ and $R^5$ are independently $C_1$-$C_{22}$ hydrocarbyl groups, $R^3$, $R^4$ and $R^5$ may be linear, branched, or cyclic (for $C_3$-$C_{22}$ hydrocarbyl groups). In addition, $R^3$, $R^4$ and $R^5$ may independently include one or more heteroatoms, such as N, O, and/or S, within the hydrocarbyl group, and may be substituted or unsubstituted. Typically, $R^3$, $R^4$ and $R^5$ are each independently selected $C_1$-$C_4$ alkyl groups. In certain embodiments, the hydrolysable group represented by X" in general formula (A") is independently selected from an alkoxy (—$OR^3$) group and an alkylamino (—$NHR^3$ or —$NR^3R^4$) group. When the hydrolysable group represented by X" in general formula (A") is the $NR^3R^4$ group, $R^3$ and $R^4$ optionally can be taken together with the N atom to which they are bonded to form a cyclic amino group.

Non-limiting, exemplary embodiments of particular species of the polyfluoropolyether silane are described in detail below. Typically in these embodiments, z is 0 such that polyfluoropolyether silane includes three hydrolysable groups represented by X". However, as described above, z can be an integer other than 0 (e.g. 1 or 2) such that these particular polyfluoropolyether silanes include fewer than three hydrolysable groups.

In certain embodiments, Y in general formula (A") is F. Typically, when Y in general formula (A") is F, subscripts c, d, and g in general formula (A") are each 0. As such, in these embodiments, when the groups indicated by subscripts c, d, and g are absent, the polyfluoropolyether silane has the general formula F—$Z_a$—$[(OC_3F_6)_b$—$(OC_2F_4)_e$—$(CF(CF_3))_f]$—$(CH_2)_h$—$X'$—$(C_nH_{2n})$—$((SiR^1{}_2$—$O)_m$—$SiR^1{}_2)_i$—$(C_jH_{2j})$—$Si$—$(X")_{3-z}(R^2)_z$.

In one embodiment in which Y in general formula (A") is F, as introduced above, Z in general formula (A") is —$(CF_2)$—, subscripts c, d, f, and g in general formula (A") are 0 and subscripts b, e, h, and n in general formula (A") are each independently an integer greater than 0. As but one example of this embodiment, subscript a is 3, subscript b is at least 1, subscript e is 1, subscript h is 1, X' is an oxygen atom, subscript n is 3, and subscripts m, i, and j are each 0. In this one example, the polyfluoropolyether silane has the following general formula: $CF_3$—$CF_2$—$CF_2$—(O—$CF_2$—$CF_2$—$CF_2)_b$—O—$CF_2$—$CF_2$—$CH_2$—O—$CH_2$—$CH_2$—$CH_2$—Si—$(X")_{3-z}(R^2)_z$. Thus, when the hydrolysable groups represented by X" are all alkoxy groups, e.g. methoxy groups, this particular polyfluoropolyether silane has the following general formula: $CF_3$—$CF_2$—$CF_2$—(O—$CF_2$—$CF_2$—$CF_2)_b$—O—$CF_2$—$CF_2$—$CH_2$—O—$CH_2$—$CH_2$—$CH_2$—Si—$(OCH_3)_3$. Alternatively, when the hydrolysable groups represented by X" are all alkylamino groups, e.g. $N(CH_3)_2$ groups, this particular polyfluoropolyether silane has the following general formula: $CF_3$—$CF_2$—$CF_2$—(O—$CF_2$—$CF_2$—$CF_2)_b$—O—$CF_2$—$CF_2$—$CH_2$—O—$CH_2$—$CH_2$—$CH_2$—Si—$(N(CH_3)_2)_3$. In these embodiments, subscript b is typically an integer from 17 to 25.

In another embodiment in which Y in general formula (A") is F and Z in general formula (A") is —$(CF_2)$—, as described above, subscripts c, d, f, and g in general formula (A") are 0 and subscripts b, e, h, n, m, i, and j in general formula (A") are each independently an integer greater than 0. As but one example of this embodiment, subscript a is 3, subscript b is at least 1, subscript e is 1, subscript h is 1, X' is an oxygen atom, subscript n is 3, subscript m and i are each 1, and subscript j is 2. In this one example, the polyfluoropolyether silane has the following general formula: $CF_3$—$CF_2$—$CF_2$—(O—$CF_2$—$CF_2$—$CF_2)_b$—O—$CF_2$—$CF_2$—$CH_2$—O—$CH_2$—$CH_2$—$CH_2$—$Si(CH_3)_2$—O—$Si(CH_3)_2$—$CH_2$—$CH_2$—Si—$(X")_{3-z}(R^2)_z$. Thus, when the hydrolysable groups represented by X" are all alkoxy groups, e.g. methoxy groups, and z is 0, this particular polyfluoropolyether silane has the following general formula: $CF_3$—$CF_2$—$CF_2$—(O—$CF_2$—$CF_2$—$CF_2)_b$—O—$CF_2$—$CF_2$—$CH_2$—O—$CH_2$—$CH_2$—$CH_2$—$Si(CH_3)_2$—O—$Si(CH_3)_2$—$CH_2$—$CH_2$—$Si(OCH_3)_3$. In these embodiments, subscript b is typically an integer from 17 to 25.

In another embodiment in which Y in general formula (A") is F, as introduced above, Z in general formula (A") is —$(CF(CF_3)CF_2O)$—. In this embodiment, subscripts b, c, d, e, and g in general formula (A") are 0, and subscripts f, h, and n in general formula (A") are each independently an integer greater than 0. As but one example of this embodiment, subscripts b, c, d, e, and g in general formula (A") are 0, subscript a is at least 1, subscript f is 1, subscript h is 1, X' is an oxygen atom, subscript n is 3, and subscripts i, m, and j are each 0. In this one example, the polyfluoropolyether silane has the following general formula: F—(CF(CF$_3$)—CF$_2$—O)$_a$—CF(CF$_3$)—CH$_2$—O—CH$_2$—CH$_2$—CH$_2$—Si—(X")$_{3-z}$(R$^2$)$_z$. Thus, when the hydrolysable groups represented by X" are all alkoxy groups, e.g. methoxy groups, and z is 0, this particular polyfluoropolyether silane has the following general formula: F—(CF(CF$_3$)—CF$_2$—O)$_a$—CF(CF$_3$)—CH$_2$—O—CH$_2$—CH$_2$—CH$_2$—Si(OCH$_3$)$_3$. Alternatively, when the hydrolysable groups represented by X" are all alkylamino groups, e.g. N(CH$_3$)$_2$ groups, this particular polyfluoropolyether silane has the following general formula: F—(CF(CF$_3$)—CF$_2$—O)$_a$—CF(CF$_3$)—CH$_2$—O—CH$_2$—CH$_2$—CH$_2$—Si—(N(CH$_3$)$_2$)$_3$. In these embodiments, subscript a is typically an integer from 14 to 20.

In another embodiment in which Y in general formula (A") is F and Z in general formula (A") is —(CF(CF$_3$)CF$_2$O)—, as introduced immediately above, subscripts b, c, d, e, and g in general formula (A") are 0, subscript a is at least 1, subscript f is 1, subscript h is 1, X' is an oxygen atom, subscript n is 3, subscripts m and i are each 1, and subscript j is 2. In this one example, the polyfluoropolyether silane has the following general formula: —(CF(CF$_3$)CF$_2$O)$_e$—CF(CF$_3$—CH$_2$—O—CH$_2$—CH$_2$—CH$_2$—Si(CH$_3$)$_2$—O—Si(CH$_3$)$_2$—CH$_2$—CH$_2$—Si—(X")$_{3-z}$(R$^2$)$_z$. Thus, when the hydrolysable groups represented by X" are all alkoxy groups, e.g. methoxy groups, and z is 0, this particular polyfluoropolyether silane has the following general formula: F—(CF(CF$_3$)CF$_2$O)$_e$—CF(CF$_3$)—CH$_2$—O—CH$_2$—CH$_2$—CH$_2$—Si(CH$_3$)$_2$—O—Si(CH$_3$)$_2$—CH$_2$—CH$_2$—Si(OCH$_3$)$_3$. In these embodiments, subscript a is typically an integer from 14 to 20.

In other embodiments, Y in general formula (A") is (R$^2$)$_z$(X")$_{3-z}$Si—(C$_j$H$_{2j}$)—((SiR$^1_2$—O)$_m$—SiR$^1_2$)$_i$—(C$_n$H$_{2n}$)—X'—(CH$_2$)$_h$—. Typically, when Y in general formula (A") is (R$^2$)$_z$(X")$_{3-z}$Si—(C$_j$H$_{2j}$)—((SiR$^1_2$—O)$_m$—SiR$^1_2$)$_i$—(C$_n$H$_{2n}$)—X'—(CH$_2$)$_h$—, subscripts b, c, and f in general formula (A") are 0. As such, in these embodiments, when the groups indicated by subscripts b, c, and f are absent, the polyfluoropolyether silane has the following general formula: Y—Z$_e$—[(OCF$_2$CF(CF$_3$))$_d$—(OC$_2$F$_4$)$_e$—(OCF$_2$)$_g$]—(CH$_2$)$_h$—X'—(C$_n$H$_{2n}$)—((SiR$^1_2$—O)$_m$—SiR$^1_2$)$_i$—(C$_j$H$_{2j}$)—Si—(X")$_{3-z}$(R$^2$)$_z$ In one embodiment in which Y in general formula (A") is (R$^2$)$_z$(X")$_{3-z}$Si—(C$_j$H$_{2j}$)—((SiR$^1_2$—O)$_m$—SiR$^1_2$)$_i$—(C$_n$H$_{2n}$)—X'—(CH$_2$)$_h$—, as introduced immediately above, Z is (CF$_2$)—, X' is an oxygen atom, subscripts b, c, d, and f in general formula (A") are 0, and subscripts e and g in general formula (A") are each independently an integer greater than 0. As but one example of this embodiment, Z is (CF$_2$)—, X' is an oxygen atom, subscripts b, c, d, f, m, i, and j in general formula (A") are 0, subscript e is at least 1, subscript g is at least 1, subscript h is 1, X' is an oxygen atom, and subscript n is 3. In this one example, the polyfluoropolyether silane has the following general formula: (R$^2$)$_z$(X")$_{3-z}$Si—CH$_2$—CH$_2$—CH$_2$—O—CH$_2$—CF$_2$—(OCF$_2$CF$_2$)$_e$—(OCF$_2$)$_g$—CH$_2$—O—CH$_2$—CH$_2$—CH$_2$—Si—(X")$_{3-z}$(R$^2$)$_z$. Thus, when the hydrolysable groups represented by X" are all alkoxy groups, e.g. methoxy groups, and z is 0, this particular polyfluoropolyether silane has the following general formula: (CH$_3$O)$_3$Si—CH$_2$—CH$_2$—CH$_2$—O—CH$_2$—CF$_2$—(OCF$_2$CF$_2$)$_e$—(OCF$_2$)$_g$—CH$_2$—O—CH$_2$—CH$_2$—CH$_2$—Si—(OCH$_3$)$_3$. Alternatively, when the hydrolysable groups represented by X" are all alkylamino groups, e.g. N(CH$_3$)$_2$ groups, and z is 0, this particular polyfluoropolyether silane has the following general formula: ((CH$_3$)$_2$N)$_3$Si—CH$_2$—CH$_2$—CH$_2$—O—CH$_2$—CF$_2$—(OCF$_2$CF$_2$)$_e$—(OCF$_2$)$_g$—CH$_2$—O—CH$_2$—CH$_2$—CH$_2$—Si—(N(CH$_3$)$_2$)$_3$.

Alternatively, in another embodiment in which Y in general formula (A") is (R$^2$)$_z$(X")$_{3-z}$Si—(C$_j$H$_{2j}$)—((SiR$^1_2$—O)$_m$—SiR$^1_2$)$_i$—(C$_n$H$_{2n}$)—X'—(CH$_2$)$_h$—, as introduced above, Z is —(CF$_2$)—, X' is an oxygen atom, subscripts b, c, e, and f in general formula (A") are 0, and subscripts d and g in general formula (A") are each independently an integer greater than 0.

Notably, in the specific formulas provided above, which are representative of exemplary polyfluoropolyether silanes, one or more fluorine atoms of the polyfluoropolyether silane may be replaced with other atoms. For example, other halogen atoms (e.g. Cl) may be present in the polyfluoropolyether silane, or the polyfluoropolyether silane may have lesser degree of fluorination. By lesser degree of fluorination, it is meant that one or more of the fluorine atoms of any of the general formulas above may be replaced with hydrogen atoms.

Methods of preparing polyfluoropolyether silanes are generally known in the art. For example, polyfluoropolyether silanes are typically prepared via a hydrosilylation reaction between an alkenyl-terminated polyfluoropolyether compound and a silane compound having a silicon-bonded hydrogen atom. The silane compound typically includes at least one hydrolysable group, such as a silicon-bonded halogen atom. The silicon-bonded halogen atom may be reacted and converted to other hydrolysable groups. for example, the silicon-bonded halogen atom may be reacted with an alcohol such that the resulting polyfluoropolyether silane compound includes alkoxy functionality attributable to the alcohol. The byproduct of such a reaction is hydrochloric acid. One of skill in the art understands how to modify the starting components to obtain the desired structure of the polyfluoropolyether silane. Specific examples of methods for preparing various polyfluoropolyether silanes are disclosed in U.S. Publ. Pat. Appln. No. 2009/0208728, which is incorporated by reference herein in its entirety.

C. Forming the Copolymer Composition

As noted above, the copolymer composition is the reaction product of Components (I) and (II).

More specifically, the copolymer composition is formed by reacting at least one of the at least one Si—OH functional group on the cured polyorganosiloxane intermediate with the polyfluoropolyether silane to form at least one covalent bond between the cured polyorganosiloxane intermediate and the polyfluoropolyether silane and make the copolymer composition.

In certain embodiments, the copolymer composition may be formed by hydrolyzing the polyfluoropolyether silane and condensing the hydrolyzed polyfluoropolyether silane with the cured polyorganosiloxane intermediate to form the at least one covalent bond. Even more specifically, the copolymer composition may be formed heating the cured polyorganosiloxane intermediate having at least one Si—OH functional group and the perfluoropolyether silane in the presence of moisture to a temperature sufficient to hydrolyze and condense the polyfluoropolyether silane with the cured polyorganosiloxane intermediate to form to form the at least one covalent bond.

Even more specifically, in certain embodiments, the copolymer composition is formed by first applying the polyfluoropolyether silane on a surface of the cured polyorganosiloxane intermediate by known techniques such as flood coating, spray coating, painting, dipping or the like to form a coating layer. In certain of these embodiments, the polyfluoropolyether silane is applied to the cured polyorganosiloxane intermediate as a liquid such as a dilute solution having from 0.01 to 10 wt %, such as 0.1 to 0.5 wt %, of polyfluoropolyether silane mixed with a fluorinated vehicle such as a fluorinated solvent. After the dilute solution is applied to the cured polyorganosiloxane intermediate, the fluorinated vehicle is allowed to evaporate, leaving a polyfluoropolyether silane coating layer on the outer surface of the cured polyorganosiloxane intermediate.

Next, the cured polyorganosiloxane intermediate having the polyfluoropolyether silane coating layer is introduced to a humidified oven. In certain embodiments, a pan of deionized water is placed in the oven to provide the humidity. The cured polyorganosiloxane intermediate having the polyfluoropolyether silane coating layer is heated to a temperature and time sufficient to allow the water to volatilize and aid in the hydrolysis of the polyfluoropolyether silane. For example, the cured polyorganosiloxane intermediate having the polyfluoropolyether silane coating layer may be heated to about 125° C. for about one hour. The heat also aids in driving the condensation of the polyfluoropolyether silane with the one or more Si—OH functional groups of the cured polyorganosiloxane intermediate to form one or more covalent bonds there between, and hence form the copolymer composition.

In certain embodiments, one or more covalent bonds that are formed between the cured polyorganosiloxane intermediate and the polyfluoropolyether silane (to form the copolymer composition) are located at an interface between the cured polyorganosiloxane intermediate and the polyfluoropolyether silane. In other embodiments, one or more of the covalent bonds between the cured polyorganosiloxane intermediate and the polyfluoropolyether silane may be located within a bulk portion of the cured polyorganosiloxane intermediate.

Once the reaction is completed, the copolymer composition is removed from the oven. At this point, the copolymer composition may be rinsed with additional fluorinated vehicle to remove any unreacted polyfluoropolyether silane.

In certain embodiments, XPS analysis of the copolymer composition formed in accordance with the above method confirms that the copolymer composition includes roughly 55 atomic percent fluorine, thus confirming that a reaction has occurred.

In certain embodiments, the formed copolymer composition described herein may have a Shore A hardness of at least 30, alternatively Shore A hardness may range from 30 to 100; as measured by ASTM D2240 by the type A durometer. (ASTM D2240 for Shore A durometer corresponds to JIS K 6253 type-A which specifies testing methods for durometer hardness of plastics.) Alternatively, the copolymer composition may have Shore A hardness up to 55, alternatively Shore A hardness may range from 30 to 55.

In certain embodiments, the copolymer composition may have a tensile strength of at least 3 MPa, alternatively tensile strength may range from 3 MPa to 14 MPa as measured by ASTM D412. Still further, the copolymer composition may have an elongation at break of at least 50%, alternatively elongation at break may range from 5% to 500%, such as from 50% to 350%, such as from 50% to 250%, also as measured by ASTM D412. The copolymer composition may exhibit excellent thermo-optic stability, improved mechanical properties, weather resistance and heat resistance. Transmittance is measured on samples initially after cure, then the samples are heated at 150° C. for 1000 hours and transmittance is measured again using a ultraviolet-visible spectrophotometer with medium scanning speed, 1 nanometer slit width to measure yellowing.

Notably, the copolymer composition of the present invention, in certain embodiments, provides substantially the same physical properties in terms of hardness, elongation, etc. and light or optical properties (such as in terms of light transmittance and refractive index) as compared with the cured polyorganosiloxane from which it is derived, but with improved anti-dust pickup properties. Such improvement in anti-dust pickup, as illustrated below, can be demonstrated by comparing samples of the copolymer composition with the cured polyorganosiloxane initially for light transmission and then comparing the same samples for light transmission after exposure to dust in a controlled dust environment.

In this testing methodology, samples having less dust accumulation after exposure to a dusty environment will retain their light transmission or other optical properties as compared with samples accumulating more dust.

D. Uses of the Formed Copolymer Composition

The resultant copolymer composition described above may be used to fabricate various optical devices. For example, such optical devices include, but are not limited to CCDs, optical cameras, photo-couplers optical waveguides, lightguides, light sensing elements, and LED packages such HB LED packages, e.g., LED package lenses. In certain embodiments, the copolymer composition can be fabricated into optically transparent protective coverings or coating layers for these optical devices having reduced dust accumulation as compared with cured polyorganosiloxanes and certain optically clear plastics and glasses. Moreover, such optically transparent protective coverings or coating layers have outstanding durability and mechanical properties consistent with the cured polyorganosiloxanes from which they are derived.

The resultant copolymer composition described above may be used to fabricate various non-optical devices. Such non-devices include any device wherein optical properties are not required, such as where the copolymer composition includes pigments or other additives to impart a particular desired color. Suitable examples of non-optical devices that may include, or comprise, the copolymer composition include, but are not limited to, keypads for computers or typewriters, coasters, and the like.

In still other uses, the copolymer composition may be used in, or comprise, a caulk, a gasket, an encapsulant, a gel, an adhesive, a conformal coating or a sealant for use in building, OEM, electronic assembly or construction applications.

Some embodiments include any one or more of the following numbered aspects.

Aspect 1. A copolymer composition comprising the reaction product of a reaction of: (I) a cured polyorganosiloxane intermediate having repeating Si—O—Si units and at least one Si—OH functional group and having a surface having a water contact angle of less than or equal to 90° as determined by ASTM 5946-04; and (II) a polyfluoropolyether silane according to the general formula (A"): Y—$Z_a$—[(OC$_3$F$_6$)$_b$—(OCF(CF$_3$)CF$_2$)$_c$—(OCF$_2$CF(CF$_3$))$_d$—(OC$_2$F$_4$)$_e$—(CF(CF$_3$))$_f$—(OCF$_2$)$_g$]—(CH$_2$)$_h$—X'—(C$_n$H$_{2n}$)—((SiR$^1$$_2$—O)$_m$—SiR$^1$$_2$)$_i$—(C$_j$H$_{2j}$)—Si—(X")$_{3-z}$(R$^2$)$_z$; wherein Z is independently selected from —(CF$_2$)—, —(CF(CF$_3$)CF$_2$O)—, —(CF$_2$CF(CF$_3$)O)—, —(CF(CF$_3$)O)—, —(CF(CF$_3$)CF$_2$)—, —(CF$_2$CF(CF$_3$))—, and —(CF(CF$_3$))—; a is an integer from 1 to 200; b, c, d, e, f, and g are integers each independently selected from 0 to 200; h, n and j are integers each independently selected from 0 to 20; i and m are integers each independently selected from 0 to 5; X' is a bivalent organic group or O; $R^1$ is an independently selected $C_1$-$C_{22}$ hydrocarbyl group; z is an integer independently selected from 0 to 2; X" is an independently selected hydrolysable group; $R^2$ is an independently selected $C_1$-$C_{22}$ hydrocarbyl group which is free of aliphatic unsaturation; and Y is selected from H, F, and $(R^2)_z(X'')_{3-z}$—Si—$(C_jH_{2j})$—$((SiR^1_2\!\!-\!\!O)_m\!\!-\!\!SiR^1_2)_i\!\!-\!\!(C_nH_{2n})\!\!-\!\!X'\!\!-\!\!(CH_2)_h\!\!-\!\!$; wherein X", X', z, $R^1$, $R^2$, j, m, i, n and h are as defined above; provided that when subscript i is 0, subscript j is also 0; when subscript i is an integer selected from 1 to 5, subscript j is an integer selected from 1 to 20 and m is an integer selected from 1 to 5.

Aspect 2. The copolymer composition according to aspect 1, wherein the cured polyorganosiloxane intermediate comprises M, D and Q units.

Aspect 3. The copolymer composition according to aspect 1, wherein the cured polyorganosiloxane intermediate comprises M, D, T and Q units.

Aspect 4. The copolymer composition according to any one of aspects 1 to 3, wherein at least one of the at least one covalent bond is located at an interface between the cured polyorganosiloxane intermediate and the polyfluoropolyether silane.

Aspect 5. The copolymer composition according to any one of aspects 1 to 4, wherein the surface of the cured polyorganosiloxane intermediate has a water contact angle ranging from 40° to 90° as determined by ASTM 5946-04.

Aspect 6. A method for making a copolymer composition comprising: providing a cured polyorganosiloxane having repeating Si—O—Si units and having a surface having a water contact angle of greater than 90° as determined by ASTM 5946-04; providing a polyfluoropolyether silane according to the general formula (A"): Y—$Z_a$—$[(OC_3F_6)_b$—$(OCF(CF_3)CF_2)_c$—$(OCF_2CF(CF_3))_d$—$(OC_2F_4)_e$—$(CF(CF_3))_f$—$(OCF_2)_g]$—$(CH_2)_h$—X'—$(C_nH_{2n})$—$((SiR^1_2$—$O)_m$ —$SiR^1_2)_i$—$(C_jH_{2j})$—Si—$(X'')_{3-z}(R^2)_z$; wherein Z is independently selected from —$(CF_2)$—, —$(CF(CF_3)CF_2O)$—, —$(CF_2CF(CF_3)O)$—, —$(CF(CF_3)O)$—, —$(CF(CF_3)CF_2)$—, —$(CF_2CF(CF_3))$—, and —$(CF(CF_3))$—; a is an integer from 1 to 200; b, c, d, e, f, and g are integers each independently selected from 0 to 200; h, n and j are integers each independently selected from 0 to 20; i and m are integers each independently selected from 0 to 5; X' is a bivalent organic group or O; $R^1$ is an independently selected $C_1$-$C_{22}$ hydrocarbyl group; z is an integer independently selected from 0 to 2; X" is an independently selected hydrolysable group; $R^2$ is an independently selected $C_1$-$C_{22}$ hydrocarbyl group which is free of aliphatic unsaturation; and Y is selected from H, F, and $(R^2)_z(X'')_{3-z}$—Si—$(C_jH_{2j})$—$((SiR^1_2\!\!-\!\!O)_m\!\!-\!\!SiR^1_2)_i\!\!-\!\!(C_nH_{2n})\!\!-\!\!X'\!\!-\!\!(CH_2)_h\!\!-\!\!$; wherein X", X', z, $R^1$, $R^2$, j, m, i, n and h are as defined above; provided that when subscript i is 0, subscript j is also 0; when subscript i is an integer greater than 0, subscript j is also an integer greater than 0; and when subscript i is an integer greater than 0, m is also an integer greater than 0; forming at least one Si—OH functional group on the cured polyorganosiloxane to make a cured polyorganosiloxane intermediate having repeating Si—O—Si units and at least one Si—OH functional group and having a surface having a water contact angle of less than or equal to 90° as determined by ASTM 5946-04; and reacting at least one of the at least one Si—OH functional group on the cured polyorganosiloxane intermediate with the polyfluoropolyether silane to form at least one covalent bond between the cured polyorganosiloxane intermediate and the polyfluoropolyether silane and make the copolymer composition.

Aspect 7. The method according to aspect 6, wherein forming at least one Si—OH functional group on the cured polyorganosiloxane comprises plasma treating the cured polyorganosiloxane using oxygen or air as a source gas.

Aspect 8. The method according to aspect 6, wherein forming at least one Si—OH functional group on the cured polyorganosiloxane comprises applying a base or peroxide to the cured polyorganosiloxane.

Aspect 9. The method according to any one of aspects 6 to 8, wherein reacting at least one of the at least one Si—OH functional group on the cured polyorganosiloxane intermediate with the polyfluoropolyether silane to form at least one covalent bond comprises: hydrolyzing the polyfluoropolyether silane; and condensing the hydrolyzed polyfluoropolyether silane with the cured polyorganosiloxane intermediate to form the at least one covalent bond.

Aspect 10. The method according to any one of aspects 6 to 8, wherein reacting at least one of the at least one Si—OH functional group on the cured polyorganosiloxane intermediate with the polyfluoropolyether silane to form at least one covalent bond comprises: heating the cured polyorganosiloxane intermediate and the perfluoropolyether silane in the presence of moisture to a temperature sufficient to hydrolyze and condense the polyfluoropolyether silane with the cured polyorganosiloxane intermediate to form to form the at least one covalent bond.

Aspect 11. The method according to any one of aspects 6 to 10 further comprising: rinsing the copolymer composition with a fluorinated vehicle to remove any unreacted polyfluoropolyether silane; and removing the fluorinated vehicle.

Aspect 12. The method according to any one of aspects 6 to 11, wherein the at least one formed covalent bond between the cured polyorganosiloxane intermediate and the polyfluoropolyether silane is located at an interface between the cured polyorganosiloxane intermediate and the polyfluoropolyether silane.

Aspect 13. The method according to any one of aspects 6 to 12, wherein the provided cured polyorganosiloxane is formed by curing a curable composition comprising the following components: (A) a polydiorganosiloxane having an average of at least two aliphatically unsaturated organic groups per molecule, optionally (B) a silicone resin having an average of at least two aliphatically unsaturated organic groups per molecule and a vinyl content of up to 3%, (C) a crosslinker having an average, per molecule, of at least two silicon-bonded hydrogen atoms, and (D) a hydrosilylation catalyst; with the proviso that components (A), optionally (B), and (C) and their amounts in the curable composition are selected such that the ratio of a total amount of silicon bonded hydrogen atoms in the curable composition/total amount of aliphatically unsaturated groups in the curable composition ranges from 0.8 to 2.0.

Aspect 14. The method according to aspect 13, wherein the silicone resin (B) is present with the proviso that components (A), (B), and (C) and their amounts in the curable composition are selected such that the ratio of a total amount of silicon bonded hydrogen atoms in the curable composition/total amount of aliphatically unsaturated groups in the curable composition ranges from 0.8 to 2.0.

Aspect 15. The method according to aspect 13 or 14, wherein the polyorganosiloxane (A) comprises: (A1) a first polydiorganosiloxane having an average of at least two aliphatically unsaturated organic groups per molecule and having a viscosity of from greater than 0 up to 12,000 mPa·s; and (A2) a second polydiorganosiloxane having an average of at least two aliphatically unsaturated organic groups per molecule and having a viscosity of at least 45,000 mPa·s.

Aspect 16. The method according to aspect 15, wherein the first polydiorganosiloxane (A1) is according to the general formula $R^3{}_3SiO$—$(R^4SiO)_{aa}$—$SiR^3{}_3$, wherein each $R^3$ and $R^4$ are independently selected from the group consisting of aliphatically unsaturated organic groups and monovalent organic groups with the proviso that the first polydiorganosiloxane (A1) has an average of at least two aliphatically unsaturated organic groups per molecule and where the subscript aa is an integer having a value sufficient to provide the first polydiorganosiloxane (A1) with a viscosity from greater than 0 up to 12,000 mPa·s.

Aspect 17. The method according to aspect 15 or aspect 16, wherein the second polydiorganosiloxane (A2) is according to the general formula $R^5{}_3SiO$—$(R^6SiO)_{bb}$—$SiR^5{}_3$, wherein each $R^5$ and $R^6$ are independently selected from the group consisting of aliphatically unsaturated organic groups and monovalent organic groups with the proviso that the first polydiorganosiloxane (A2) has an average of at least two aliphatically unsaturated organic groups per molecule and where the subscript bb is an integer having a value sufficient to provide the second polydiorganosiloxane (A2) with a viscosity greater than 45,000 mPa·s.

Aspect 18. The method according to any one of aspects 15 to 17, wherein the silicone resin (B) comprises monofunctional units (M Units) represented by $R^7{}_3SiO_{1/2}$ and tetrafunctional units (Q Units) represented by $SiO_{4/2}$, wherein each $R^7$ independently is selected from the group consisting of aliphatically unsaturated organic groups and monovalent organic groups with the proviso that the silicone resin has an average of at least two aliphatically unsaturated organic groups per molecule and has a vinyl content not to exceed 3%.

Aspect 19. The method according to aspect 18, wherein the molar ratio of monofunctional units to tetrafunctional units in the silicone resin (B) ranges from 0.6:1 to 1.1:1.

Aspect 20. The method according to any one of aspects 15 to 19, wherein the silicone resin (B) has a number average molecular weight ranging from 2,000 to 5,000 g/mol.

Aspect 21. The method according to any one of aspects 13 to 20, wherein the crosslinker (C) comprises a polyorganohydrogensiloxane.

Aspect 22. The method according to aspect 21, wherein the polyorganohydrogensiloxane comprises a linear polyorganohydrogensiloxane according to the formula: $HR^8{}_2SiO$—$(R^8SiO)_{cc}$—$SiR^8{}_2H$, wherein each $R^8$ are a hydrogen atom or a monovalent organic groups with the proviso that at least two $R^8$ per molecule are hydrogen atoms and wherein the subscript cc is an integer with a value of 1 or more.

Aspect 23. The method according to aspect 21, wherein the polyorganohydrogensiloxane comprises a branched polyorganohydrogensiloxane according to the formula: $(R^9SiO_{3/2})_{dd}(R^9{}_2SiO_{2/2})_{ee}(R^9SiO_{1/2})_{ff}(SiO_{4/2})_{gg}(X'''O)_{hh}$; wherein X''' is any alkoxy functional group; each $R^9$ are a hydrogen atom or a monovalent organic groups with the proviso that at least two $R^9$ per molecule are hydrogen atoms; the subscript dd is a positive number; the subscript ee is 0 or a positive number; the subscript ff is 0 or a positive number; the subscript gg is 0 or a positive number; the subscript hh is 0 or a positive number; ee/dd has a value ranging from 0 to 10; ff/ee has a value ranging from 0 to 5; gg/(dd+ee+ff+gg) has a value ranging from 0 to 0.3; and hh/(dd+ee+ff+gg) has a value ranging from 0 to 0.4.

Aspect 24. The method according to any one of aspects 6 to 12, wherein the provided cured polyorganosiloxane is formed by curing a curable composition comprising the following components: (A') an organopolysiloxane of the following average structural formula: $R^{10}{}_kSiO_{(4-k)/2}$ wherein $R^{10}$ designates unsubstituted or halogen-substituted monovalent hydrocarbon groups; however, in one molecule at least two groups designated by $R^{10}$ are alkenyl groups and at least 30 mole % of all groups designated by $R^{10}$ are aryl groups; and "k" is a number ranging from 0.6 to 2.1; (B') an organopolysiloxane that contains in one molecule at least two silicon-bonded hydrogen atoms and at least 15 mole % of all silicon-bonded organic groups in the form of aryl groups; optionally (C') a branched-chain organopolysiloxane of the following average unit formula: $(R^{11}SiO_{3/2})_o(R^{11}{}_2SiO_{2/2})_p(R^{11}{}_3SiO_{1/2})_q(SiO_{4/2})_r(X''''O_{1/2})_s$ wherein each $R^{11}$ independently designates an alkyl group, alkenyl group, aryl group, or an epoxy-containing organic group; however, in one molecule at least 5 mole % of all groups designated by $R^{11}$ are alkenyl groups, at least 15 mole % of all groups designated by $R^{11}$ are aryl groups, and at least 10 mole % of all groups designated by $R^{11}$ are epoxy-containing organic groups; X'''' designates a hydrogen atom or an alkyl group; and "o" is a positive number, "p" is 0 or a positive number, "q" is 0 or a positive number, "r" is 0 or a positive number, "s" is 0 or a positive number, "p/o" is a number ranging from 0 to 10, "q/o" is a number ranging from 0 to 5, "r/(o+p+q+r)" has a value ranging from 0 to 0.3, and "s/(o+p+q+r)" has a value ranging from 0 to 0.02; and (D') a hydrosilylation catalyst; wherein component (B') is used in such an amount that the mole ratio of the silicon-bonded hydrogen atoms contained in component (B) to the alkenyl groups contained in component (A') and optional component (C') is in the range of 0.1 to 5; wherein optional component (C') is contained in an amount of 0.1 to 20 parts by mass per 100 parts by mass of the sum of components (A') and (B'); and component (D') is contained in an amount sufficient to accelerate curing of the curable composition.

Aspect 25. The method according to aspect 24, wherein component (C') is present and comprises the branched-chain organopolysiloxane of the following average unit formula: $(R^{11}SiO_{3/2})_o(R^{11}{}_2SiO_{2/2})_p(R^{11}{}_3SiO_{1/2})_q(SiO_{4/2})_r(X''''O_{1/2})_s$ wherein each $R^{11}$ independently designates an alkyl group, alkenyl group, aryl group, or an epoxy-containing organic group; however, in one molecule at least 5 mole % of all groups designated by $R^{11}$ are alkenyl groups, at least 15 mole % of all groups designated by $R^{11}$ are aryl groups, and at least 10 mole % of all groups designated by $R^{11}$ are epoxy-containing organic groups; X'''' designates a hydrogen atom or an alkyl group; and "o" is a positive number, "p" is 0 or a positive number, "q" is 0 or a positive number, "r" is 0 or a positive number, "s" is 0 or a positive number, "p/o" is a number ranging from 0 to 10, "q/o" is a number ranging from 0 to 5, "r/(o+p+q+r)" has a value ranging from 0 to 0.3, and "s/(o+p+q+r)" has a value ranging from 0 to 0.02; wherein component (B') is used in such an amount that the mole ratio of the silicon-bonded hydrogen atoms contained in component (B) to the alkenyl groups contained in component (A') and (C') is in the range of 0.1 to 5; wherein component (C') is contained in an amount of 0.1 to 20 parts by mass per 100 parts by mass of the sum of components (A') and (B'); and component (D') is contained in an amount sufficient to accelerate curing of the curable composition.

Aspect 26. The method according to aspect 24 or 25, wherein component (A') is a linear-chain organopolysiloxane of the following general formula: $R^{12}{}_3SiO(R^{12}{}_2SiO)_t SiR^{12}{}_3$ wherein $R^{12}$ independently designates an unsubstituted or halogen-substituted monovalent hydrocarbon group; however, in one molecule at least two groups designated by $R^{12}$ are alkenyl groups and at least 30 mole % of all groups designated by $R^{12}$ are aryl groups; and "t" is an integer ranging from 5 to 1,000); and/or a branched-chain organopolysiloxane of the following average unit formula: $(R^{13}SiO_{3/2})_u(R^{13}{}_2SiO_{2/2})_v(R^{13}{}_3SiO_{1/2})_w(SiO_{4/2})_x(X''''O_{1/2})_y$, wherein $R^{13}$ and $X''''$ are the same as defined above; however, in one molecule at least two groups designated by $R^{13}$ are alkenyl groups and at least 30 mole % of all groups designated by $R^{13}$ are aryl groups; and "u" is a positive number, "v" is 0 or a positive number, "w" is 0 or a positive number, "x" is 0 or a positive number, "y" is 0 or a positive number; "v/u" is a number ranging from 0 to 10, "w/u" is a number ranging from 0 to 5, "x/(u+v+w+x)" is a number ranging from 0 to 0.3, and "y/(u+v+w+x)" has a value ranging from 0 to 0.4.

Aspect 27. The method according to aspect 24 or 25, wherein component (B') is a linear-chain organopolysiloxane represented by the following general formula: $R^{14}{}_3SiO(R^{14}{}_2SiO)_iSiR^{14}{}_3$ wherein $R^{14}$ independently designates hydrogen atoms, or unsubstituted or halogen-substituted monovalent hydrocarbon groups; however, in one molecule at least two groups designated by $R^{14}$ are hydrogen atoms and at least 15 mole % of all groups designated by $R^3$ are aryl groups; and "ii" is an integer ranging from 5 to 1,000); and/or a branched-chain organopolysiloxane of the following average unit formula: $(R^{14}SiO_{3/2})_{jj}(R^{14}{}_2SiO_{2/2})_{kk}(R^{14}{}_3SiO_{1/2})_{ll}(SiO_{4/2})_{mm}(X''''O_{1/2})_{nn}$ wherein $R^{14}$ and $X''''$ are the same as defined above; however, in one molecule at least two groups designated by $R^{14}$ are hydrogen atoms and at least 15 mole % of all groups designated by $R^{14}$ are aryl groups; and "jj" is a positive number, "kk" is 0 or a positive number, "ll" is 0 or a positive number, "mm" is 0 or a positive number, "nn" is 0 or a positive number; "kk/p" is a number ranging from 0 to 10, "ll/jj" is a number ranging from 0 to 5, "s/(jj+kk+ll+mm)" is a number ranging from 0 to 0.3, and "nn/(jj+kk+ll+mm)" has a value ranging from 0 to 0.4.

Aspect 28. The method according to any one of aspects 25 to 27, wherein the mass-average molecular weight of component (C') is at least 2,000 g/mol.

Aspect 29. The method according to any one of aspects 24 to 28, wherein, in one molecule of component (A'); the alkenyl groups designated by $R^{11}$ are vinyl groups, and the at least 30 mole % of all groups designated by $R^{11}$ which are aryl groups comprise at least 40 mole % phenyl groups.

Aspect 30. The method according to any one of aspects 24 to 29, wherein component (B') contains, in one molecule, at least 25 mole % of all silicon-bonded organic groups in the form of aryl groups.

Aspect 31. The method according to any one of aspects 24 to 29, wherein, in one molecule of component (B'); the at least 15 mole % of groups designated by $R^{14}$ which are aryl groups comprise at least 40 mole % phenyl groups.

Aspect 32. The method according to any one of aspects 25 to 31, wherein, in component (C'), each $R^{13}$ independently designates a methyl group, vinyl group, phenyl group, or 3-glycidoxypropyl group; however, in one molecule at least 8 mole % of all groups designated by $R^{13}$ are alkenyl groups, at least 25 mole % of all groups designated by $R^{13}$ are aryl groups, and at least 20 mole % of all groups designated by $R^{13}$ are epoxy-containing organic groups.

Aspect 33. The method according to any one of aspects 25 to 32, wherein: component (B') is used in such an amount that the mole ratio of the silicon-bonded hydrogen atoms contained in component (B) to the alkenyl groups contained in components (A') and (C') is in the range of 0.5 to 2; component (C') is contained in an amount of 0.1 to 10 parts by mass per 100 parts by mass of the sum of components (A) and (B); and component (D') is contained in an amount sufficient to accelerate curing of the composition which is an amount of 0.01 to 500 ppm of the metal atoms of component (D') per mass of the composition.

Aspect 34. A copolymer composition formed in accordance with the method of any one of aspects 6 to 33.

Aspect 35. Use of the copolymer composition according to any one of aspects 1 to 5 and/or aspect 34 in an optical device.

Aspect 36. Use of the copolymer composition according to any one of aspects 1 to 5 and/or aspect 34 in a non-optical device.

Aspect 37. Use of the copolymer composition according to any one of aspects 1 to 5 and/or aspect 34 in an anti-dust surface application.

Aspect 38. A caulk, gasket, encapsulant, gel, adhesive, conformal coating or sealant comprising the copolymer composition according to any one of aspects 1 to 5 and/or aspect 34.

Aspect 39. Use of the copolymer composition according to any one of aspects 1 to 5 and/or aspect 34 as a caulk, gasket, encapsulant, gel, adhesive, conformal coating or sealant in building, OEM, electronic assembly or construction applications.

The following examples are intended to illustrate the invention and are not to be viewed in any way as limiting to the scope of the invention.

EXAMPLES

These examples are intended to illustrate the invention to one of ordinary skill in the art and should not be interpreted as limiting the scope of the invention set forth in the claims.

Transmittance was measured on samples using a Cary 5000 spectrophotometer (or UV-VIS spectrophotometer).

Example 1—Evaluation of Cured Polyorganosiloxane Plaques (Samples A and B) and Copolymer Composition Plaques (Samples C and D) For Dust Pickup A. Preparation of Sample Plaques A-D 1. Preparation of Cured Polyorganosiloxane Sample Plaques (Samples A and B)

The components used to form Sample A (48×48×4 mm plaques) are provided in Example 3 of WO 2010/138,221 and is herein incorporated by reference in its entirety.

The components used to form Sample B (48×48×4 mm plaques) are provided in Comparative Example 4 of WO 2010/138,221 and is herein incorporated by reference in its entirety.

The molding equipment for forming the Sample Plaques A and B was a Sodick Plustech LS40R injection molder held at 140° C.

The process for forming Sample Plaques A and B was as follows. First, each of the components for forming the plaques (as noted above) were mixed and injected into the mold (having a mold finish cavity held at 140° C.) at an injection pressure of about 150 kg/cm² with an injection speed of about 10.00 mm/sec. The hold pressure was approximately 120 kg/cm² with a hold time of 30 seconds and a cure time of 90 seconds. After molding, Sample Plaques A and B were post-cured for 1 hour at 150° C.

The formed plaques for Samples A and B were measured for light transmittance at 450 nm and at other wavelengths across the visible spectrum of light (i.e., from 360-740 nm), with the results summarized below in Table 1.

A portion of the formed plaques of Samples A and B were further processed according to Steps 3 and 4 below to form Samples C and D. Each of the Samples A-D was then evaluated for dust pickup in Section B below.

2. Preparation of Dilute Solution of Polyfluoropolyether Silane

A polyfluoropolyether silane solution was prepared as follows.

First, a polyfluoropolyether silane was prepared substantially in accordance with Synthesis Example 1 of U.S. Pat. No. 8,211,248; which is herein incorporated by reference in its entirety. Next, the polyfluoropolyether silane was diluted in 3M Novec HFE-7200 fluorinated solvent to form a dilute solution having 0.1 wt % polyfluoropolyether silane.

3. Plasma Treatment of Samples A and B to Form Cured Polyorganosiloxane Intermediate Plaques A portion of the plaques for Samples A and B were plasma treated using either oxygen or air as the source gas to form respective cured polyorganosiloxane intermediate plaques. The remainder of the plaques for Samples A and B were evaluated as described in Section II below.

Plasma activation of the surface of a portion may be completed using a March Instruments PX-250 at a fixed RF of 13.56 MHz. The Sample plaque A or B was placed into the chamber with the relevant surfaces being exposed to plasma. The activation gas may be air or an oxygen containing mixture of gases. The gas pressure within the chamber was set to 300 mTorr and a plasma power was supplied at 100 watts for 30 seconds. The plasma treatment applied to Sample A or Sample B formed respective cured polyorganosiloxane intermediate plaques having one or more Si—OH functional groups.

4. Formation of Copolymer Composition Plaques (Samples C and D) from Cured Polyorganosiloxane Intermediate Plaques The cured polyorganosiloxane intermediate plaques were removed from the plasma chamber and within 15 minutes of being plasma treated the plaques were flood coated with the dilute solution of polyfluoropolyether silane formed in Step 2 above. Alternatively the cured polyorganosiloxane intermediate plaques could be spray coated, painted, dip coated or otherwise exposed to the dilute solution of polyfluoropolyether silane formed in Step 2 above.

Next, the 3M Novec HFE-7200 fluorinated solvent was allowed to evaporate. The polyfluoropolyether silane coated sample was then placed in an oven at 120° C. for 1 hour. The oven was humidified by placing a pan of de-ionized water in the bottom of the oven. The samples were then removed from the oven and cooled to room temperature, wherein excess uncured polyfluoropolyether silane was washed away using additional 3M Novec HFE-7200 fluorinated solvent. The resultant copolymer composition plaques were identified as Samples C and D (with Sample C being formed from the Sample A plaque and Sample D being formed from the Sample B plaque).

B. Evaluation of Samples Plagues A-D for Dust Pickup

1. Initial Preparation of Sample Plagues A-D Prior to Dust Testing

Samples A-D were individually sandwiched between a pair of pre-cleaned microscopic glass slides for determination of initial light transmittances values. Tape was applied around the edges of Samples A-D to prevent the sample plaque composition from wetting to the glass slides.

Samples A-D were then evaluated for light transmission at 450 nm and at various wavelengths across the visible light spectrum (360-740 nm) with a Cary 5000 spectrophotometer with an integrating sphere, with the initial light transmissions recorded and the results summarized in Table 1 below:

TABLE 1

| Sample | Dust Test Condition* | % Transmission at 450 nm | | Average % Transmission from 360-740 nm | |
|---|---|---|---|---|---|
| | | Sample A or B | Sample C or D | Sample A or B | Sample C or D |
| A or C | Before | A - 79.9% | C - 79.2% | A - 80.1% | C - 79.7% |
| B or D | Before | B - 79.9% | D - 79.7% | B - 80.1% | D - 80.0% |

The % light transmission values, as summarized in Table 1, include Fresnel losses at each of the six interfaces of the sandwich of the glass slides and respective sample.

As Table 1 confirms, copolymer composition plaques (Samples C and D) demonstrated negligible differences in light transmission values at 450 nm and negligible differences in light transmission values across the visible light spectrum as compared with polyorganosiloxane plaques (Samples A and B).

2. Dust Testing of Sample Plagues A-D

After initial determinations of light transmission values, Samples A-D were then prepared for dust testing by the following procedure. First, the glass slides were removed from the respective samples, and a piece of tape was placed over one side of each respective Sample A-D, thus allowing the opposite side of the Sample A-D to be dusted. Allowing only one side of the sample to be dusted best represents how the plaque samples would be used on fixtures or parts, in which only the outside of the fixture/part would become dusty.

Next, a dust testing container was prepared, in which 5 grams of ASHRAE (American Society of Heating, Refrigerating, and Air Conditioning Engineers) #2 dust was added to a FlackTek 300 g dental cup (1 liter cup). One of Samples A-D was then added to the dental cup including the dust. As noted in the previous paragraph, one side of the sample was covered with tape such that only the un-taped side is dusted.

The dental cup was then closed and randomly shaken by hand for 30 seconds. The dental cup was allowed to sit for a few moments to allow the dust to settle. The dental cup was then opened in a fume hood to capture any residual dust, and the respective sample was extracted with a tweezers. To remove excess dust, the respective sample was tapped against the side of the dental cup several times. This left only dust that was "attached" to the respective sample.

Next, the tape was removed from the back of the respective sample and the sample was once again sandwiched in between the pair of glass slides. Finally, tape was applied around the edges of the glass slides to seal in the samples and any residual dust. Once sealed, the sample was placed back into the Cary 5000 spectrophotometer and measured for light transmittance with the dust free (previously taped) side facing the spectrophotometer light source and away from the integrating sphere.

Using these new light transmission measurements, a comparison of the light transmission both before and after dust testing for each of the Samples A-D was determined. A smaller percentage decrease in light transmission, and hence improved light output after dust testing, was indicative that the respective samples did not accumulate dust along their respective exposed surface. Light transmission values before and after dust test for Samples A-D are summarized in Table 2 below, while the results expressed as a percent decrease in light transmission for each of Samples A-D are shown in Table 3 below:

TABLE 2

| Sample | Dust Test Condition | % Transmission at 450 nm Sample (A or B) | % Transmission at 450 nm Sample (C or D) | Average % Transmission from 360-740 nm Sample (A or B) | Average % Transmission from 360-740 nm Sample (C or D) |
|---|---|---|---|---|---|
| A or C | Before | A - 79.9% | C - 79.2% | A - 80.1% | C - 79.7% |
| A or C | After | A - 63.2% | C - 69.8% | A - 65.9% | C - 71.7% |
| B or D | Before | B - 79.9% | D - 79.7% | B - 80.1% | D - 80.0% |
| B or D | After | B - 48.1% | D - 68.0% | B - 51.6% | D - 70.2% |

TABLE 3

| | Percent decrease in light transmission after dust testing (SAMPLES A and C) 450 nm | Percent decrease in light transmission after dust testing (SAMPLES A and C) Ave. 360-740 nm | Percent decrease in light transmission after dust testing (SAMPLE B and D) 450 nm | Percent decrease in light transmission after dust testing (SAMPLE B and D) Ave. 360-740 nm |
|---|---|---|---|---|
| Sample A or B | A - 20.9% | A - 17.7% | B - 39.8% | B - 36.8% |
| Sample C or D | C - 11.9% | C - 10.0% | D - 14.7% | D - 12.2% |

As Tables 2 and 3 confirm, copolymer composition plaques (Samples C and D) demonstrated significant decrease in light transmission value loss after dust testing as compared with polyorganosiloxane plaques formed from the same cured polyorganosiloxane (Samples A and B). This improvement suggests that the copolymer compositions of Samples C and D resisted dust accumulation as compared with Samples A and B).

Example 2—Evaluation of Cured Polyorganosiloxane Plaques (Sample A) and Copolymer Composition Plaques (Sample C) For Dust Pickup Performance Durability The durability of the performance of copolymer composition (Sample C) as compared with a cured polyorganosiloxane (Sample A) was demonstrated in 1000 hours of accelerated aging under UV irradiation (340 nm, 0.1 mW/cm$^2$), high temperature (150° C.) and blue LED light and heat (450 nm 50 mW/cm$^2$, 100° C.) according to the following procedure.

Five (5) plaques of Samples A and C were prepared for each condition in accordance with the method described in Example 1 above, with the exception that the plaques used to form Sample C were plasma treated at 200 watts for 180 seconds, as opposed to 100 watts for 30 seconds as described above, and then placed in an oven at 125° C. for 1 hour, as opposed to 120° C. for 1 hour.

All samples were rinsed clean and dried before being placed in the aging environments. The sample plaques were measured at times 0 (initial condition), 100 hours, 500 hours and 1000 hours for transmission after the sample was 'dusted' to simulate exposure to an extreme saturated environment as described in Part B of Example 1 above.

Figure 1:
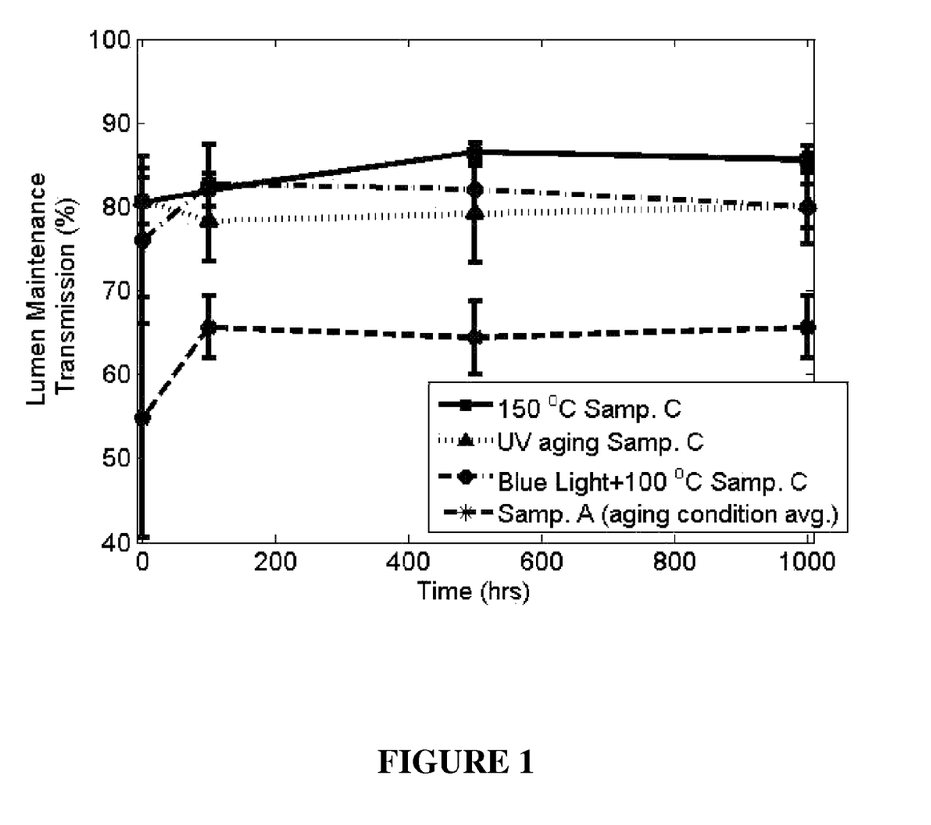
FIG. 1 is a graph plotting average light transmission and standard deviation of the samples of Example 2 after dust treatment.

The average transmission and standard deviation after dust treatment are shown in the FIG. 1 and Table 4 below. For clarity the un-treated samples (Sample A) are combined into a single sample set.

TABLE 4

| | | Dusted Transmission (lm, %) Average +/− Standard Deviation | | | |
|---|---|---|---|---|---|
| | Sample Set | 0 hours | 100 hours | 500 hours | 1000 hours |
| Sample C | 150° C. Sample C | 80.5 +/− 4.0 | 82.0 +/− 2.0 | 86.5 +/− 1.0 | 85.7 +/− 1.6 |
| | UV Light | 80.6 +/− 2.8 | 78.3 +/− 4.9 | 79.1 +/− 5.8 | 80.1 +/− 4.5 |
| | Blue LED 100° C. | 76.0 +/− 10.0 | 82.7 +/− 4.7 | 82.1 +/− 3.4 | 80.0 +/− 2.7 |
| Sample A | Aged (combined) | 54.8 +/− 14.3 | 65.6 +/− 3.7 | 64.4 +/− 4.4 | 65.5 +/− 3.8 |

In all conditions the treated dusted optical silicone samples (Sample C) maintained the improved transmission versus the untreated dusted silicone samples (Sample A).

The transmission of the samples in the durability test as provided in Table 4 is displayed in lumens, to better represent the experience of an average observer. The luminous flux, measured in the SI unit lumens, is calculated by the integrated product of a given spectrum, here a standard 2900 K CCT LED ($I_{LED}\lambda$)) transmitted through the test samples ($T_{MS}(\lambda)$), and the Photopic Response Curve V(λ) where λ is the wavelength of light, as calculated by the equation:

lumens=∫$I_{LED}(\lambda)T_{MS}(\lambda)V(\lambda)d\lambda$

Figure 2:
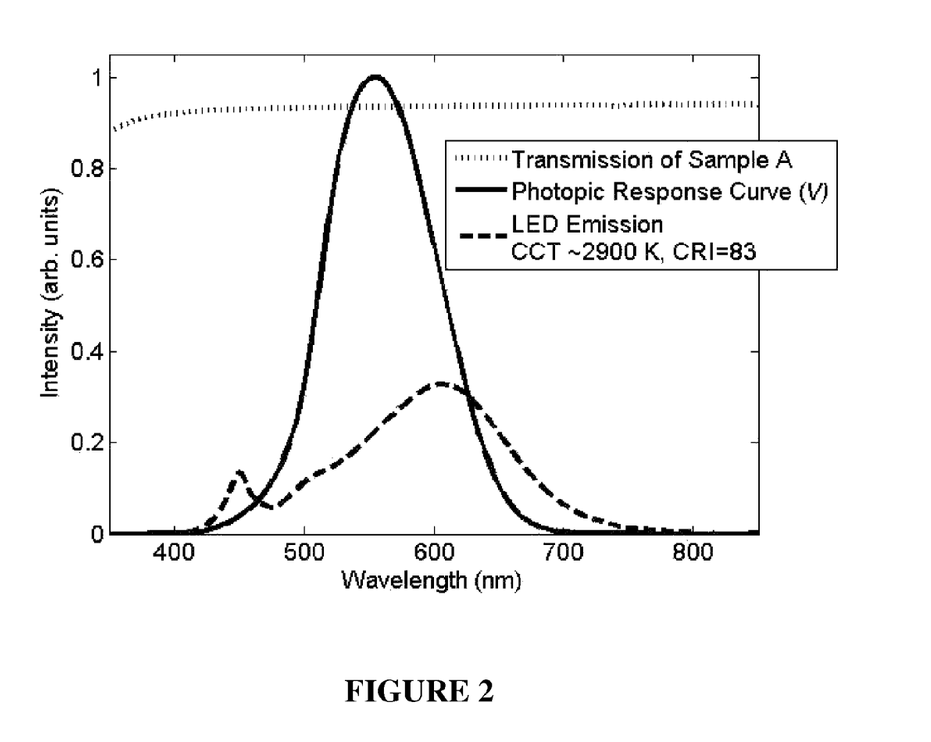
FIG. 2 is a graph plotting a light transmission spectrum of Sample A of Example 2 within the visible light spectrum.

Also, the transmission spectrum for Sample A, V(λ), and the incident LED spectrum assumed for this calculation are shown in FIG. 2.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. An optical device comprising a copolymer composition comprising the reaction product of a reaction of:
(I) a cured polyorganosiloxane intermediate having repeating Si—O—Si units and at least one Si—OH functional group and having a surface having a water contact angle of less than or equal to 90° as determined by ASTM 5946-04; and
(II) a polyfluoropolyether silane according to the general formula (A"):

wherein Z is independently selected from —(CF$_2$)—, —(CF(CF$_3$)CF$_2$O)—, —(CF$_2$CF(CF$_3$)O)—, —(CF(CF$_3$)O)—, —(CF(CF$_3$)CF$_2$)—, —(CF$_2$CF(CF$_3$))—, and —(CF(CF$_3$))—; a is an integer from 1 to 200; b, c, d, e, f, and g are integers each independently selected from 0 to 200; h, n and j are integers each independently selected from 0 to 20; i and m are integers each independently selected from 0 to 5; X' is a bivalent organic group or O; R$^1$ is an independently selected C$_1$-C$_{22}$ hydrocarbyl group; z is an integer independently selected from 0 to 2; X" is an independently selected hydrolysable group; R$^2$ is an independently selected C$_1$-C$_{22}$ hydrocarbyl group which is free of aliphatic unsaturation; and Y is selected from H, F, and (R$^2$)$_z$(X")$_{3-z}$Si—(C$_j$H$_{2j}$)—((SiR$^1$$_2$—O)$_m$—SiR$^1$$_2$)$_i$—(C$_n$H$_{2n}$)—X'—(CH$_2$)$_h$—; wherein X", X', z, R$^1$, R$^2$, j, m, i, n and h are as defined above;
provided that when subscript i is 0, subscript j is also 0; when subscript i is an integer selected from 1 to 5, subscript j is an integer selected from 1 to 20 and m is an integer selected from 1 to 5; wherein the optical device is one selected from the group consisting of windows, optical waveguides, optical lenses, mixing chambers, lighting reflectors, light engines, troffers, optical cameras, photo-couplers, charged couplers, lightguides, light sensing elements, and LED packages.

2. The optical device according to claim 1, wherein the cured polyorganosiloxane intermediate comprises M, D and Q units.

3. The optical device according to claim 1, wherein the cured polyorganosiloxane intermediate comprises M, D, T and Q units.

4. The optical device according to claim 1, wherein at least one of the at least one covalent bond is located at an interface between the cured polyorganosiloxane intermediate and the polyfluoropolyether silane.

5. The optical device copolymer composition according to claim 1, wherein the surface of the cured polyorganosiloxane intermediate has a water contact angle ranging from 40° to 90° as determined by ASTM 5946-04.

6. A method for making an optical device, the method comprising making a copolymer composition comprising:
providing a cured polyorganosiloxane having repeating Si—O—Si units and having a surface having a water contact angle of greater than 90° as determined by ASTM 5946-04;
providing a polyfluoropolyether silane according to the general formula (A"):

wherein Z is independently selected from —(CF$_2$)—, —(CF(CF$_3$)CF$_2$O)—, —(CF$_2$CF(CF$_3$)O)—, —(CF(CF$_3$)O)—, —(CF(CF$_3$)CF$_2$)—, —(CF$_2$CF(CF$_3$))—, and —(CF(CF$_3$))—; a is an integer from 1 to 200; b, c, d, e, f, and g are integers each independently selected from 0 to 200; h, n and j are integers each independently selected from 0 to 20; i and m are integers each independently selected from 0 to 5; X' is a bivalent organic group or O; R$^1$ is an independently selected C$_1$-C$_{22}$ hydrocarbyl group; z is an integer independently selected from 0 to 2; X" is an independently selected hydrolysable group; R$^2$ is an independently selected C$_1$-C$_{22}$ hydrocarbyl group which is free of aliphatic unsaturation; and Y is selected from H, F, and (R$^2$)$_z$(X")$_{3-z}$Si—(C$_j$H$_{2j}$)—((SiR$^1$$_2$—O)$_m$—SiR$^1$$_2$)$_i$—(C$_n$H$_{2n}$)—X'—(CH$_2$)$_h$—; wherein X", X', z, R$^1$, R$^2$, j, m, i, n and h are as defined above;
provided that when subscript i is 0, subscript j is also 0; when subscript i is an integer greater than 0, subscript j is also an integer greater than 0; and when subscript i is an integer greater than 0, m is also an integer greater than 0;
forming at least one Si—OH functional group on the cured polyorganosiloxane to make a cured polyorganosiloxane intermediate having repeating Si—O—Si units and at least one Si—OH functional group and having a surface having a water contact angle of less than or equal to 90° as determined by ASTM 5946-04; and
reacting at least one of the at least one Si—OH functional group on the cured polyorganosiloxane intermediate with the polyfluoropolyether silane to form at least one covalent bond between the cured polyorganosiloxane intermediate and the polyfluoropolyether silane and make the copolymer composition
wherein the copolymer is formed into an optical device selected from the group consisting of windows, optical waveguides, optical lenses, mixing chambers, lighting reflectors, light engines, troffers, optical cameras, photo-couplers, charged couplers, lightguides, light sensing elements, and LED packages.

7. The method according to claim 6 further comprising:
rinsing the copolymer composition with a fluorinated vehicle to remove any unreacted polyfluoropolyether silane; and
removing the fluorinated vehicle.

* * * * *